US012795503B2

(12) United States Patent
Singh et al.

(10) Patent No.: US 12,795,503 B2
(45) Date of Patent: Nov. 10, 2026

(54) FIRST NODE, SECOND NODE AND METHODS PERFORMED THEREBY, FOR SENDING A GRANT TO A WIRELESS DEVICE COMPRISED IN A MULTI-HOP PATH COMPRISING A PLURALITY OF RELAY NODES

(71) Applicant: Telefonaktiebolaget LM Ericsson (publ), Stockholm (SE)

(72) Inventors: Bikramjit Singh, Raasepori (FI); Mårten Ericson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 18/576,550

(22) PCT Filed: Jul. 8, 2021

(86) PCT No.: PCT/SE2021/050700
§ 371 (c)(1),
(2) Date: Jan. 4, 2024

(87) PCT Pub. No.: WO2023/282805
PCT Pub. Date: Jan. 12, 2023

(65) Prior Publication Data
US 2025/0016653 A1 Jan. 9, 2025

(51) Int. Cl.
*H04W 40/22* (2009.01)
*H04B 7/155* (2006.01)
(Continued)

(52) U.S. Cl.
CPC ........ *H04W 40/22* (2013.01); *H04B 7/15542* (2013.01); *H04L 45/20* (2013.01); *H04W 72/23* (2023.01)

(58) Field of Classification Search
CPC ..... H04W 40/22; H04W 72/23; H04W 84/18; H04B 7/15542; H04L 45/20
See application file for complete search history.

(56) References Cited

U.S. PATENT DOCUMENTS

2018/0132264 A1 5/2018 Jung et al.
2020/0059821 A1 2/2020 Wirth et al.
2022/0078755 A1* 3/2022 Xu ........................ H04L 1/1819

FOREIGN PATENT DOCUMENTS

EP 3005811 A1 4/2016
EP 3570617 A1 11/2019
(Continued)

OTHER PUBLICATIONS

3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.

*Primary Examiner* — Mohammad S Anwar
(74) *Attorney, Agent, or Firm* — Sage Patent Group

(57) ABSTRACT

A computer-implemented method, performed by a first node (111). The method is for sending a grant to a wireless device (130) comprised in a multi-hop path (115) comprising a plurality of relay nodes (120). The first node (111), the plurality of relay nodes (120) and the wireless device (130) operate in a wireless communications network (100). The first node (111) sends (504) the grant to the wireless device (130). The grant indicates an allocation of first time-frequency resources to the wireless device (130), and an indication of the multi-hop path (115). The grant thereby indicates the allocation of respective second time-frequency resources to each of the relay nodes (120) in the multi-hop path (115). The first time-frequency resources and the respective second time-frequency resources are allocated in a same transmission occasion.

18 Claims, 19 Drawing Sheets

(51) Int. Cl.
*H04L 45/00* (2022.01)
*H04W 72/23* (2023.01)

(56) References Cited

FOREIGN PATENT DOCUMENTS

| | | | |
|---|---|---|---|
| WO | 2008015567 | A2 | 2/2008 |
| WO | 2014191039 | A1 | 12/2014 |
| WO | 2016209136 | A1 | 12/2016 |
| WO | 2020068940 | A1 | 4/2020 |
| WO | 2020164741 | A1 | 8/2020 |
| WO | 2020211951 | A1 | 10/2020 |

* cited by examiner a)

b)

c)

a)

b)

FIRST NODE, SECOND NODE AND METHODS PERFORMED THEREBY, FOR SENDING A GRANT TO A WIRELESS DEVICE COMPRISED IN A MULTI-HOP PATH COMPRISING A PLURALITY OF RELAY NODES

TECHNICAL FIELD

The present disclosure relates generally to a first node, and methods performed thereby, for sending a grant to a wireless device comprised in a multi-hop path comprising a plurality of relay nodes. The present disclosure also relates generally to a second node, and methods performed thereby, for receiving the grant from the first node.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. The so-called 5th Generation (5G) system, from a radio perspective, started to be standardized in 3GPP, and the so-called New Radio or Next Radio (NR) is the name for the radio interface. NR architecture is being discussed in 3GPP. In the current concept, gNB denotes the NR BS, where one NR BS may correspond to one or more transmission/reception points.

In the context of this disclosure, the expression Downlink (DL) may be used for the transmission path from the base station to the wireless device. The expression Uplink (UL) may be used for the transmission path in the opposite direction i.e., from the wireless device to the base station. Two devices may communicate directly without going a base station in what is referred to as a sidelink (SL).

Sidelink in NR and LTE

Sidelink transmissions over NR are specified in Release 16. Four new enhancements are particularly introduced to NR sidelink transmissions as follows. As a first enhancement, not only broadcast but also unicast and groupcast may be supported in sidelink transmissions. For unicast and groupcast, the Physical Sidelink Feedback CHannel (PSFCH) is introduced for a receiving UE to reply decoding status to a transmitting UE. As a second enhancement, to improve the latency performance, grant-free transmissions that may be adopted in NR uplink transmissions may also be provided in NR sidelink transmissions. As a third enhancement, to alleviate resource collisions among different sidelink transmissions launched by different UEs, NR sidelink may enhance channel sensing and resource selection procedures, which may also lead to a new design of the Physical Sidelink Control Channel (PSCCH). As a fourth enhancement, added QoS management, including congestion control, may make it possible to achieve a high connection density of devices using NR sidelink transmissions.

To enable the above enhancements, new physical channels and reference signals are introduced in NR, which may be understood to have been available in LTE before. First, the Physical Sidelink Shared Channel (PSSCH), which may be understood as the SL version of the Physical Downlink Shared Channel (PDSCH) was introduced. The PSSCH may be transmitted by a sidelink transmitting UE, which may convey sidelink transmission data, System Information Blocks (SIBs) for Radio Resource Control (RRC) configuration, and a part of Sidelink Control Information (SCI). Second, the PSFCH was introduced, which may be understood as the Physical Sidelink, SL version of the Physical Uplink Control Channel (PUCCH) of LTE. The PSFCH may be transmitted by a sidelink receiving UE for unicast and groupcast, which may convey 1-bit information over 1 Resource Block (RB) for the Hybrid Automatic Retransmission reQuest (HARQ) ACKnowledgement (ACK) and the negative ACK (NACK). In addition, Channel State Information (CSI) may be carried in the Medium Access Control (MAC) Control Element (CE) over the PSSCH instead of the PSFCH. Third, the Physical Sidelink Common Control Channel (PSCCH), which may be understood as the SL version of the Physical Downlink Control Channel (PDCCH). When the traffic to be sent to a receiving UE arrives at a transmitting UE, the transmitting UE may be required to first send the PSCCH, which may convey a part of SCI, which may be understood as the SL version of Downlink Control Information (DCI) in LTE, to be decoded by any UE for the channel sensing purpose, including the reserved time-frequency resources for transmissions, Demodulation Reference Signal (DMRS) pattern and antenna port, etc. Fourth, the Sidelink Primary Synchronization Signal (SPSS) and the Secondary Synchronization Signal (SSSS) were introduced, collectively referred as SPSS/SSSS. Similar to downlink transmissions in NR, in sidelink transmissions, Primary Synchronization Signals (PSS) and Secondary Synchronization Signals (SSSS) may be supported. Through detecting the SPSS and SSSS, a UE may be able to identify the Sidelink Synchronization IDentity (SSID) from the UE sending the SPSS/SSSS. Through detecting the SPSS/SSSS, a UE may therefore be able to know the characteristics of the UE transmitting the SPSS/SSSS. A series of processes of acquiring timing and frequency synchronization together with the SSIDs of UEs is called initial cell search. It may be noted that the UE sending the SPSS/SSSS may not be necessarily involved in sidelink transmissions, and a node, e.g., any of a UE, eNB or a gNB, sending the SPSS/SSSS is called a synchronization source. Fifth, the Physical Sidelink Broadcast Channel (PSBCH) was introduced. The PSBCH may be transmitted along with the SPSS/SSSS as a synchronization signal/PSBCH block (SSB). The SSB may have the same numerology as PSCCH/PSSCH on that carrier, and an SSB may need to be transmitted within the bandwidth of the configured BandWidth Part (BWP). The PSBCH may convey information related to synchronization, such as the Direct Frame Number (DFN), indication of the slot and symbol level time resources for sidelink transmissions, in-coverage indicator, etc. The SSB may be transmitted periodically at every 160 milliseconds (ms). Sixth, the DeModulation Reference Signal (DMRS), Phase Tracking Reference Signal (PT-RS), Channel State Information Reference Signal (CSIRS) were introduced. These physical reference signals supported by NR downlink/uplink transmissions may also be adopted by sidelink transmissions. Similarly, the PT-RS may only be applicable for Frequency 2 (FR2) transmission.

Another new feature is the two-stage Sidelink Control Information (SCI). As mentioned above, this may be understood as a version of the DCI for SL. Unlike the DCI, only part, e.g., a first stage, of the SCI may be sent on the PSCCH. This part may be used for channel sensing purposes, including the reserved time-frequency resources for transmissions, demodulation reference signal (DMRS) pattern and antenna port, etc, and maybe read by all UEs while the remaining, e.g., a second stage, scheduling and control information, such as a 8-bits source identity (ID) and a 16-bits destination ID, New Data Indicator (NDI), Redundancy Version (RV) and HARQ process ID may be sent on the PSSCH to be decoded by the receiving UE.

Similar as for Proximity based Services (PROSE) in LTE, NR sidelink transmissions may have the two modes of resource allocations: Mode 1, wherein sidelink resources may be scheduled by a gNB, and Mode 2, wherein a UE may autonomously select sidelink resources from a (pre-) configured sidelink resource pool(s) based on the channel sensing mechanism.

For the in-coverage UE, a gNB may be configured to adopt Mode 1 or Mode 2. For the out-of-coverage UE, only Mode 2 may be adopted.

As in LTE, scheduling over the sidelink in NR may be performed in different ways for Mode 1 and Mode 2.

Mode 1 may support the two kinds of grants: dynamic grants and configured grants.

For a dynamic grant, when the traffic, to be sent over the sidelink, arrives at a transmitting UE, this UE may need to launch the four-message exchange procedure to request sidelink resources from a gNB, that is, a Scheduling Request (SR) on the UL, a grant on the DL, A Buffer Status Report (BSR) on the UL, and a grant for data on the SL sent to UE. During the resource request procedure, the gNB may allocate a SideLink Radio Network Temporary Identifier (SL-RNTI) to the transmitting UE, e.g., during Random Access (RA). If this sidelink resource request is granted by the gNB, then the gNB may indicate the resource allocation for the PSCCH and the PSSCH in the Downlink Control Information (DCI) conveyed by PDCCH with Cyclic Redundancy Check (CRC) scrambled with the SL-RNTI. When a transmitting UE receives such a DCI, the transmitting UE may obtain the grant only if the scrambled CRC of the DCI may be successfully solved by the assigned SL-RNTI. A transmitting UE may then indicate the time-frequency resources and the transmission scheme of the allocated PSSCH in the PSCCH and launch the PSCCH and the PSSCH on the allocated resources for sidelink transmissions. When a grant is obtained from a gNB, a transmitting UE may only transmit a single Transport Block (TB). As a result, this kind of grant may be suitable for traffic with a loose latency requirement.

A configured grant may be used for the traffic with a strict latency requirement, and for which performing the four-message exchange procedure to request sidelink resources may induce unacceptable latency. In this case, prior to the traffic arrival, a transmitting UE may perform the four-message exchange procedure and request a set of resources. If a grant may be obtained from a gNB, then the requested resources may be reserved in a periodic manner. Upon traffic arriving at a transmitting UE, this UE may launch the PSCCH and the PSSCH on the upcoming resource occasion. In fact, this kind of grant may also be known as grant-free transmission.

Both dynamic and configured grants may be addressed to the transmitting UE, and therefore a sidelink receiving UE may not receive the DCI. Instead, a receiving UE may need to perform blind decoding to identify the presence of PSCCH and find the resources for the PSSCH through the SCI.

The SCI may comprise a first and second part. The first part, sent on PSCCH, May comprise reserved time-frequency resources for transmissions, demodulation reference signal (DMRS) pattern and antenna port, etc., and the second part, sent on PSSCH, may comprise an 8-bits source IDentity (ID) and a 16-bits destination ID. SCI, in the 2nd part, may also include a 1-bit New Data Indicator (NDI), 2-bit Redundancy Version (RV), and 4-bit HARQ process ID.

When a transmitting UE launches the PSCCH, CRC may also be inserted in the SCI without any scrambling.

In the Mode 2 resource allocation, when traffic arrives at a transmitting UE, this transmitting UE may need to autonomously select resources for the PSCCH and the PSSCH. To further minimize the latency of the feedback HARQ ACK/NACK transmissions and subsequent retransmissions, a transmitting UE may also reserve resources for PSCCH/PSSCH for retransmissions. To further enhance the probability of successful Transport Block (TB) decoding at one shot and thus suppress the probability to perform retransmissions, a transmitting UE may repeat the TB transmission along with the initial TB transmission. This mechanism may also be known as blind retransmission. As a result, when traffic arrives at a transmitting UE, then this transmitting UE may need to select resources for the following transmissions. First, the PSSCH associated with the PSCCH for initial transmission and blind retransmissions. Second, the PSSCH associated with the PSCCH for retransmissions.

Since each transmitting UE in sidelink transmissions may need to autonomously select resources for the above transmissions, preventing different transmitting UEs from selecting the same resources may turn out to be a critical issue in Mode 2. A particular resource selection procedure may therefore be imposed to Mode 2 based on channel sensing. The channel sensing algorithm may involve measuring Reference Signal Received Power (RSRP) on different sub-channels and may require knowledge of the different UEs power levels of DMRS on the PSSCH or the DMRS on the PSCCH depending on the configuration. This information may be known only after receiving SCI launched by, e.g., all, other UEs.

Integrated Access Backhaul (IAB) Networks

Densification via the deployment of more and more base stations, macro or micro base stations, is one of the mechanisms that may be employed to satisfy the ever-increasing demand for more and more capacity in mobile networks. Due to the availability of more spectrum in the millimeter wave (mmw) band, deploying small cells that operate in this band is an attractive option for these purposes. However, optical fiber to every base station will be too costly and sometimes not even possible, e.g., at historical sites. Hence, using a wireless link for connecting the small cells to the network of an operator may be a more inexpensive and more practical alternative. One such solution is the Integrated Access and Backhaul (IAB) network. The main IAB principle may be understood to be the use of wireless links for the backhaul, instead of fiber, to enable flexible and very dense deployment of cells without the need for densifying the transport network. Use case scenarios for IAB may include coverage extension, deployment of massive number of small cells and Fixed Wireless Access (FWA), e.g., to residential and/or office buildings.

FIG. 1 shows a high-level architectural view of an IAB network, according to TR 38.874, v. 16.0.0. During the study item phase of the IAB work, a summary of the study item may be found in the technical report TR 38.874, it has been agreed to adopt a solution that leverages the Central Unit (CU)/Distributed Unit (DU) split architecture of NR. Particularly, FIG. 1 shows a reference diagram for IAB in standalone mode, which contains one IAB-donor 1 and multiple IAB-nodes 2. The IAB-donor 1 may be treated as a single logical node that may comprise a set of functions, such as DU3, a CU-CP 4, a CU-UP 5 and potentially other functions 6. In a deployment, the IAB-donor 1 may be split according to these functions, which may all be either collocated or non-collocated as allowed by 3GPP NG-RAN architecture. The IAB-donor 1 may be connected to a Core Network (CN) 7. A UE 8 may gain access to the network via one of the IAB-nodes 2 to which the IAB-donor 1 may provide a wireless backhaul link. An IAB node may consist of a DU part, which may serve UEs 8 and possible other so-called child IAB nodes 9, and a Mobile Termination (MT) part, which may handle the backhaul link towards another IAB (DU) node or the IAB (DU) donor.

The Baseline User Plane (UP) and Control Plane (CP) protocol stacks for IAB are shown in FIG. 2 and FIG. 3, respectively. FIG. 2 depicts the baseline UP protocol stack for IAB in Rel-16, in each of a UE 10, an IAB-donor 11, a first IAB-node (IAB-node 1) 12, and an access IAB-node (IAB-node 2) 13. Each of the IAB-donor 11, the first IAB-node 23, and the access IAB-node 24 may have a DU 14. Each of the first IAB-node 12 and the access IAB-node 13 have also an MT 15. The IAB-donor 22 has a CU-UP 16. The connections are depicted between the different protocols, in the different entities, either via UE's DRB 17, and/or a BH RLC channel 18 in FIG. 2. An IPV6 flow label and DSCP may indicate the BH RLC Channel. As shown in FIG. 3, the chosen protocol stacks may reuse the current CU-DU split specification in rel-15, where the full user plane F1-U 19 (General Packet Radio Service Tunneling Protocol User Plane (GTP-U) 20/User Datagram Protocol (UDP) 21/Internet Protocol (IP) 22) may be terminated at the IAB node 13, as a normal DU. Network Domain Security (NDS) may have been employed to protect both UP and CP traffic, IPsec 23, in the case of UP. A new layer, called adaptation layer, the final name of this layer to be used in the standard is still pending, has been introduced in the IAB nodes and the IAB donor, which may be used for routing of packets to the appropriate downstream/upstream node and also mapping the UE bearer data to the proper backhaul RLC channel, and also between ingress and egress backhaul RLC channels in intermediate IAB nodes, to satisfy the end to end QoS requirements of bearers. This is depicted in FIG. 2 as the Adapt 24 layer. FIG. 2 further depicts the Radio Link Control (RLC) 25, the SDAP 26 and the Packet Data Convergence Protocol (PDCP) 27 protocols at the indicated entities, and their interconnections.

FIG. 3 depicts baseline control plane (CP) Protocol stack for IAB in Rel-16. As depicted in FIG. 3, the full control plane F1-C (F1-AP 30/Stream Control Transmission Protocol (SCTP) 31/IP 32) may also be terminated at the IAB node 13, as a normal DU. In this case, NDS may have been employed to protect both UP and CP traffic, Datagram Transport Layer Security (DTLS) 33 in the case of CP. IPsec could also be used for the CP protection instead of DTLS 33, in which case, no DTLS layer would be used. FIG. 3 further depicts, the Radio Resource Control (RRC) 34 protocol at the indicated entities, and their interconnections. The connections are depicted between the different protocols, in the different entities, either via UE's SRB 17, BH RLC channel 18, Intra-donor F1-C 35, and/or MT's SRB 36, as indicated in each of panel a), panel b) and panel c) of FIG. 3.

The RRC connection for the IAB node is between the MT and the CU-CP, which is also the case for the UEs connected to the IAB (DU). A UE in active mode may perform measurements in order to provide the network with its current radio conditions. These measurements may be used in the current transfer of user data and in the management and configuration of the system. The same applies to the MT of the IAB node. Hence, measurement reports may end up in the CU-CP.

In the case of inter-CU topology adaptation due to deteriorating radio link quality of the backhaul link of an IAB node, hence, the link between the MT and the IAB-donor or parent IAB node (IAB DU) in case of multi-hop, the current approach in TR38.874 is "when the migrating IAB-node's MT connects to the target CU during Inter-gNB handover, the IAB-node's DU has to discontinue service since it loses connectivity to its source CU. Consequently, UEs connected to this DU observe RLF". Thus, the UE will suffer from Radio Link Failure (RLF) and may be required to perform RRC reconnection establishment in case of inter-CU topology adaptation.

In the case of intra-CU topology adaptation due deteriorating radio link quality of an IAB node there may not be an RLF if the handover is successful.

Existing methods for handling transmissions in a multi-hop deployment may lead to waste of radio resources, increased latency, waste of processing resources, waste of energy resources and increased interference.

SUMMARY

As part of the development of embodiments herein, one or more challenges with the existing technology will first be identified and discussed.

Currently, SL transmission and SL reception are treated as independent events, and thus their resource allocation is handled independently. This may be a problem in case of a multi-hop scenario. For example, if a packet is being transmitted over multiple relay nodes, then the packet may be received by a Relay Node (RN), and may be transmitted to next RN/UE in the next hop. Thus, these events may be understood to be correlated.

It is an object of embodiments herein to improve the handling of handling of SL transmission in a wireless communications network. It is a particular object of embodiments herein to provide an easier scheduling solution tailored to a multi-hop scenario, taking advantage of the correlation between transmission and reception events in such a scenario. It is a further particular object of embodiments herein to improve the sending of a grant to a wireless device comprised in a multi-hop path comprising a plurality of relay nodes in a wireless communications network.

According to a first aspect of embodiments herein, the object is achieved by a computer-implemented method, performed by a first node. The method is for sending a grant to a wireless device comprised in a multi-hop path. The multi-hop path comprises a plurality of relay nodes. The first node, the plurality of relay nodes and the wireless device operate in a wireless communications network. The first node sends the grant to the wireless device. The grant indicates an allocation of first time-frequency resources to the wireless device. The grant also indicates an indication of the multi-hop path. The grant thereby indicates the allocation of respective second time-frequency resources to each of the relay nodes in the multi-hop path. The first time-frequency resources and the respective second time-frequency resources are allocated in a same transmission occasion.

According to a second aspect of embodiments herein, the object is achieved by a computer-implemented method performed by a second node. The method is for receiving the grant from the first node. The second node is one of the wireless device comprised in the multi-hop path comprising the plurality of relay nodes, and one of the relay nodes in the plurality of relay nodes. The wireless device, the plurality of relay nodes and the first node operate in the communications network. The second node receives the grant from the first node. The grant indicates the allocation of first time-frequency resources to the wireless device, and the indication of the multi-hop path. The grant thereby indicates the allocation of the respective second time-frequency resources to each of the relay nodes in the multi-hop path. The first time-frequency resources and the respective second time-frequency resources are allocated in the same transmission occasion.

According to a third aspect of embodiments herein, the object is achieved by the first node. The first node is for sending the grant to the wireless device configured to be comprised in the multi-hop path configured to comprise the plurality of relay nodes. The plurality of relay nodes and the wireless device are configured to operate in the wireless communications network. The first node is further configured to send the grant to the wireless device. The grant is configured to indicate: a) the allocation of first time-frequency resources to the wireless device, and b) the indication of the multi-hop path. The grant thereby is configured to indicate the allocation of respective second time-frequency resources to each of the relay nodes in the multi-hop path. The first time-frequency resources and the respective second time-frequency resources are configured to be allocated in the same transmission occasion.

According to a fourth aspect of embodiments herein, the object is achieved by the second node. The second node is for receiving the grant from the first node. The second node is configured to be one of: a) the wireless device configured to be comprised in the multi-hop path configured to comprise the plurality of relay nodes, and b) one of the relay nodes in the plurality of relay nodes. The wireless device, the plurality of relay nodes and the first node. are configured to operate in the wireless communications network. The second node is further configured to receive the grant from the first node. The grant is configured to indicate: a) the allocation of first time-frequency resources to the wireless device, and b) the indication of the multi-hop path. The grant thereby is configured to indicate the allocation of the respective second time-frequency resources to each of the relay nodes in the multi-hop path. The first time-frequency resources and the respective second time-frequency resources are configured to be allocated in the same transmission occasion.

By sending the grant, the grant indicating the allocation of the first time-frequency resources to the wireless device, and the indication of the multi-hop path, the grant may thereby indicate the allocation of respective second time-frequency resources to each of the relay nodes in the multi-hop path implicitly, wherein the first time-frequency resources and the respective second time-frequency resources are allocated in the same transmission occasion. That is, the first node may enable the wireless device to receive the grant, and the replay nodes in the plurality of nodes to derive their respective allocation. Hence, the first node may provision resources to the wireless device and the plurality of relay nodes with less signalling. The first node may therefore save resources, both processing resources, and radio resources, e.g., particularly control resources, such as, PDCCH. Hence, the first node may decrease latency, save energy resources and decrease interference.

The second node may be understood to be the receiver of the grant, that is, any of the wireless device and any of the relay nodes in the plurality of relay nodes 120. Hence, by receiving the grant, the second node may be enabled to obtain, e.g., derive, the allocation, and thereby obtain the same technical advantages just described.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to the challenges described in the Summary section or other challenges. There are, proposed herein, various embodiments which address one or more of the issues disclosed herein.

As a simplified overview, according to embodiments herein, all nodes that may be involved in a multi-hop path, e.g., gNB, Relay Nodes and the UE, may be scheduled at the same occasion. This may be understood to mean that a relay node may be allocated what is referred to herein as a "semi-persistent bidirectional" resource occasion, where each occasion may comprise transmission resource and reception resource. If there is more than one relay node in the path, then all these nodes may be allocated similar semi-persistent bidirectional resource, but the resources at each node may be understood to occur at different defined time offsets.

According to the foregoing, embodiments herein may be understood to relate to a bidirectional semi-persistent allocation of resources in a multi-hop communication, as will be described in detail further down.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
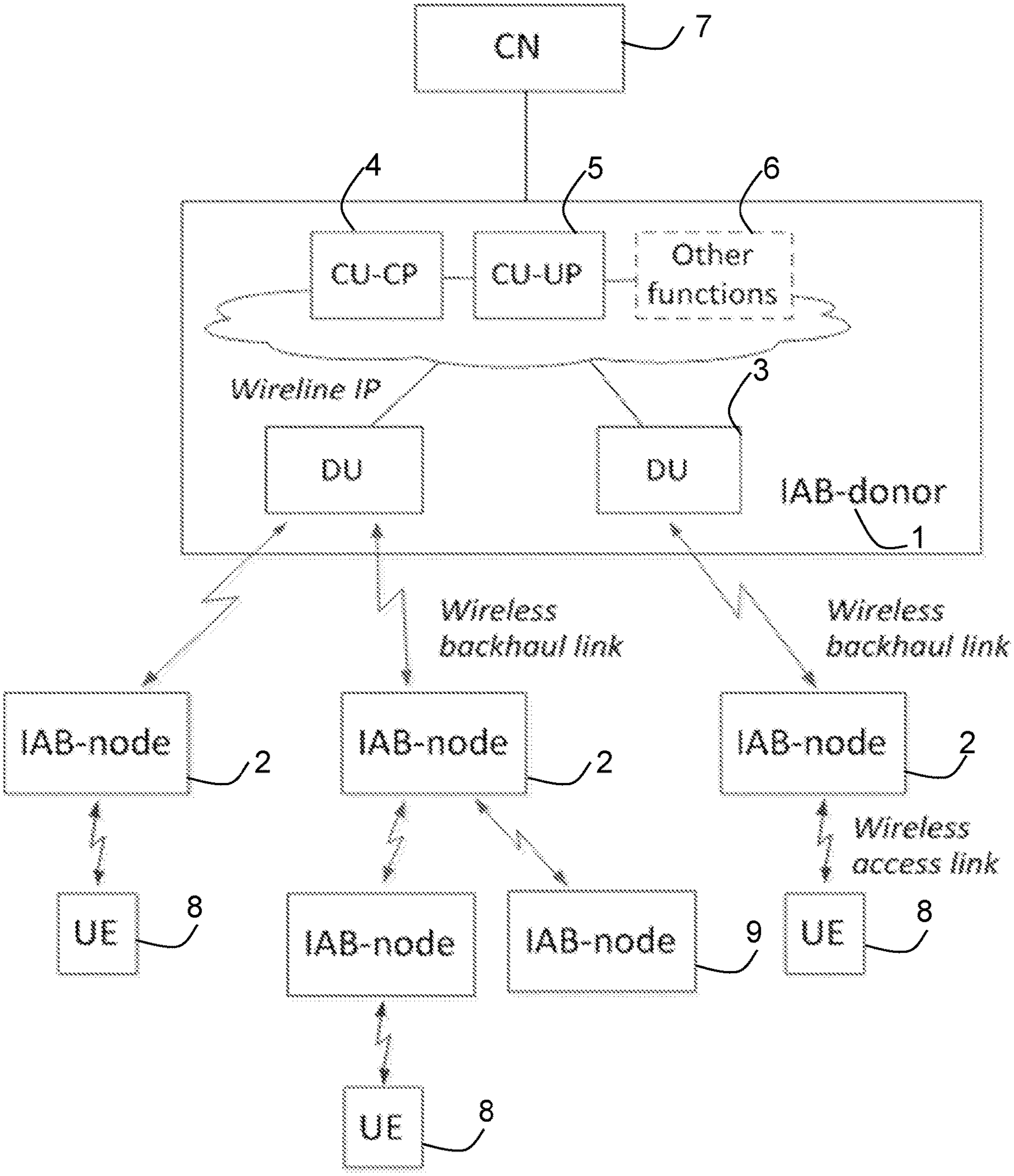
FIG. 1 is a schematic diagram illustrating an example of a reference diagram for IAB-architectures, TR 38.874, according to existing methods.
Figure 2:
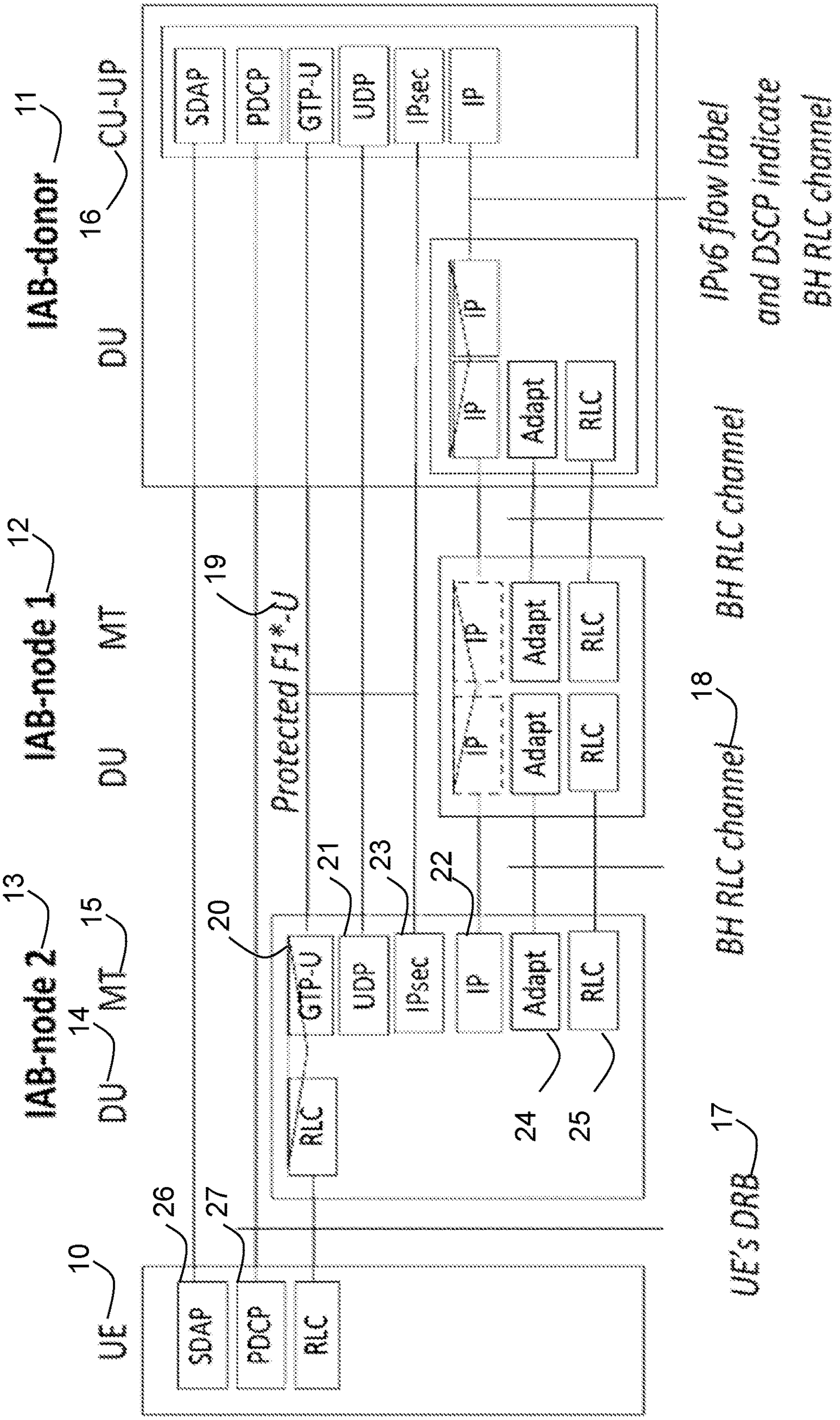
FIG. 2 is a schematic diagram illustrating an example of a baseline User Plane (UP) Protocol stack for IAB in rel-16, according to existing methods.
Figure 3:
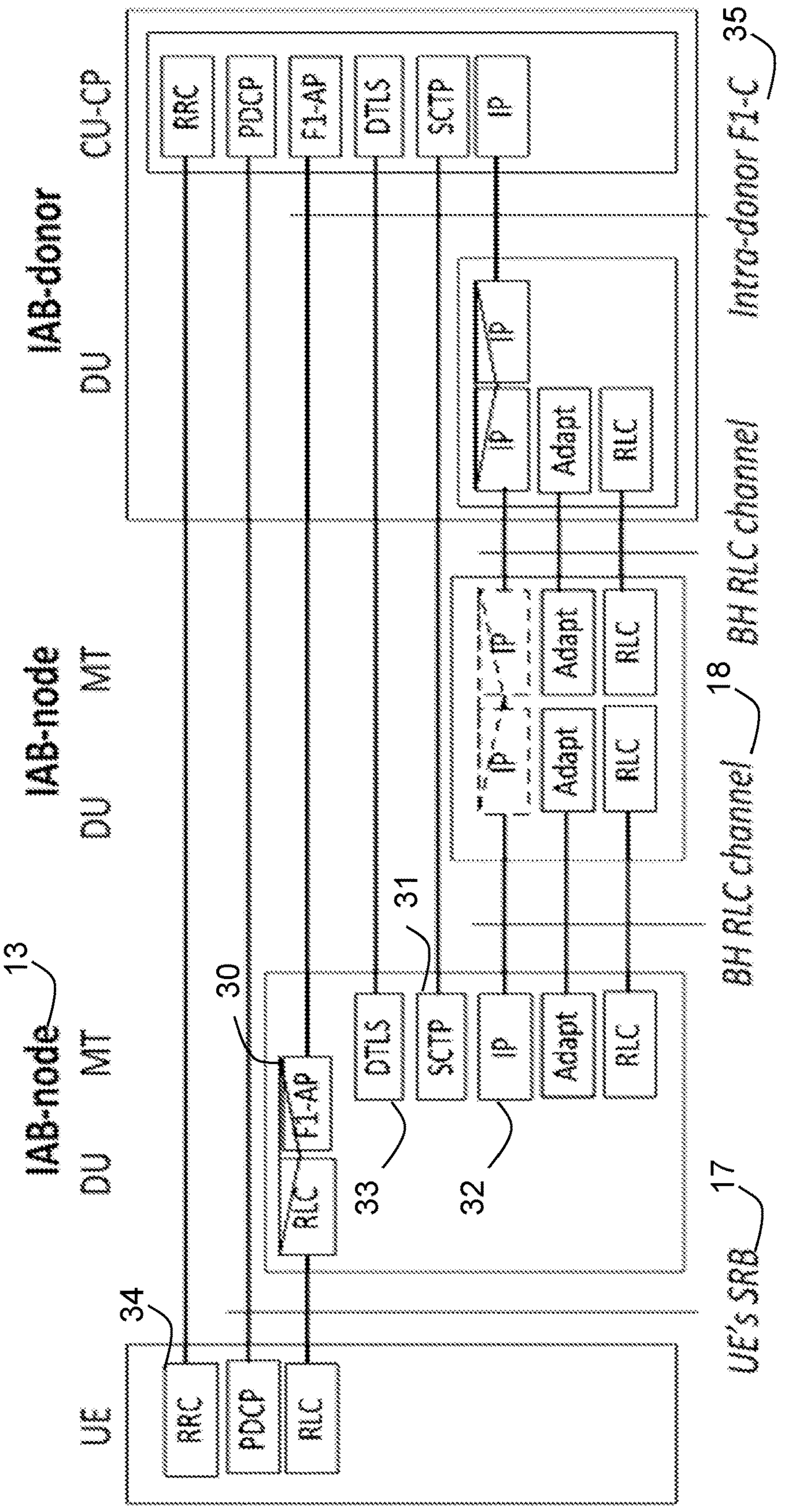
FIG. 3 is a schematic diagram illustrating an example of a baseline control plane (CP) Protocol stack for IAB in rel-16, according to existing methods.
Figure 3:
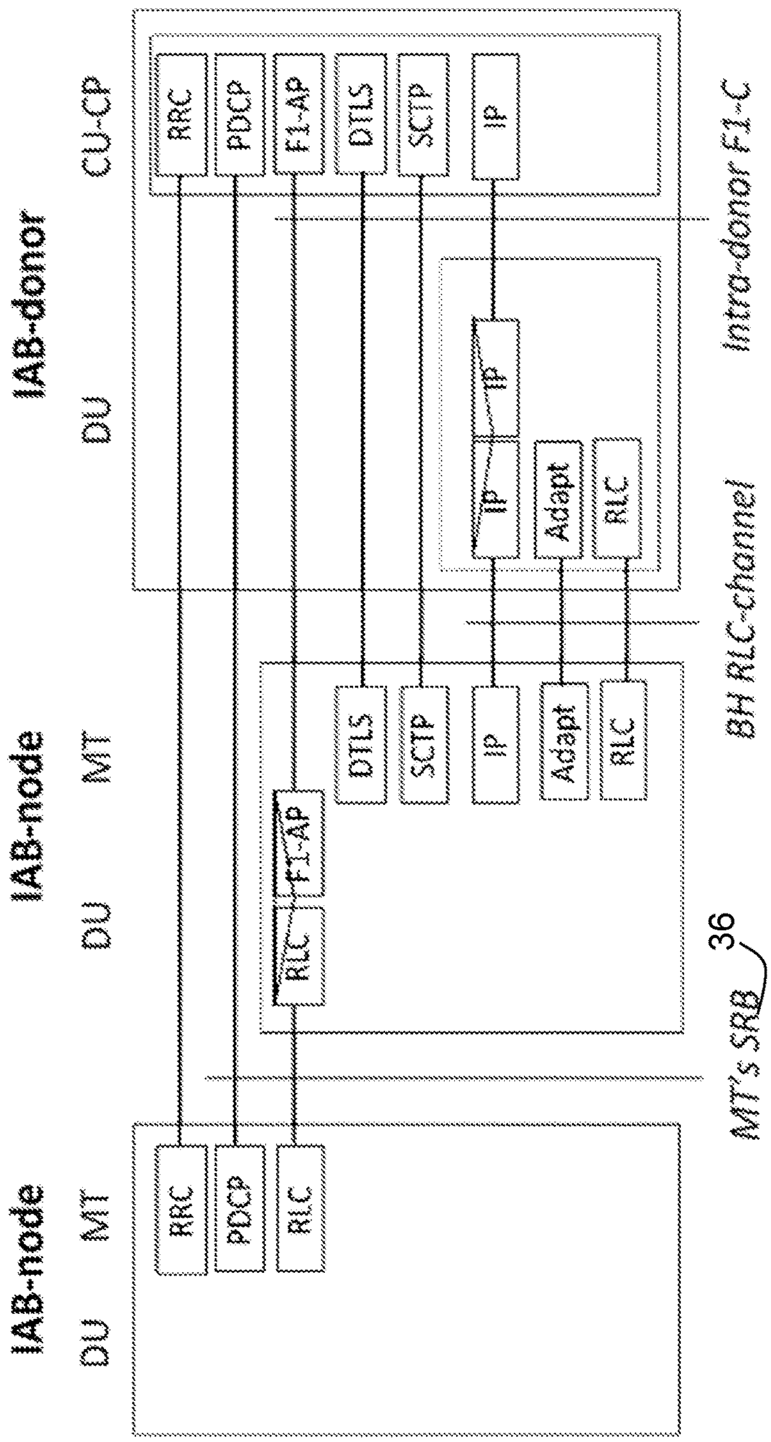
Figure 3:
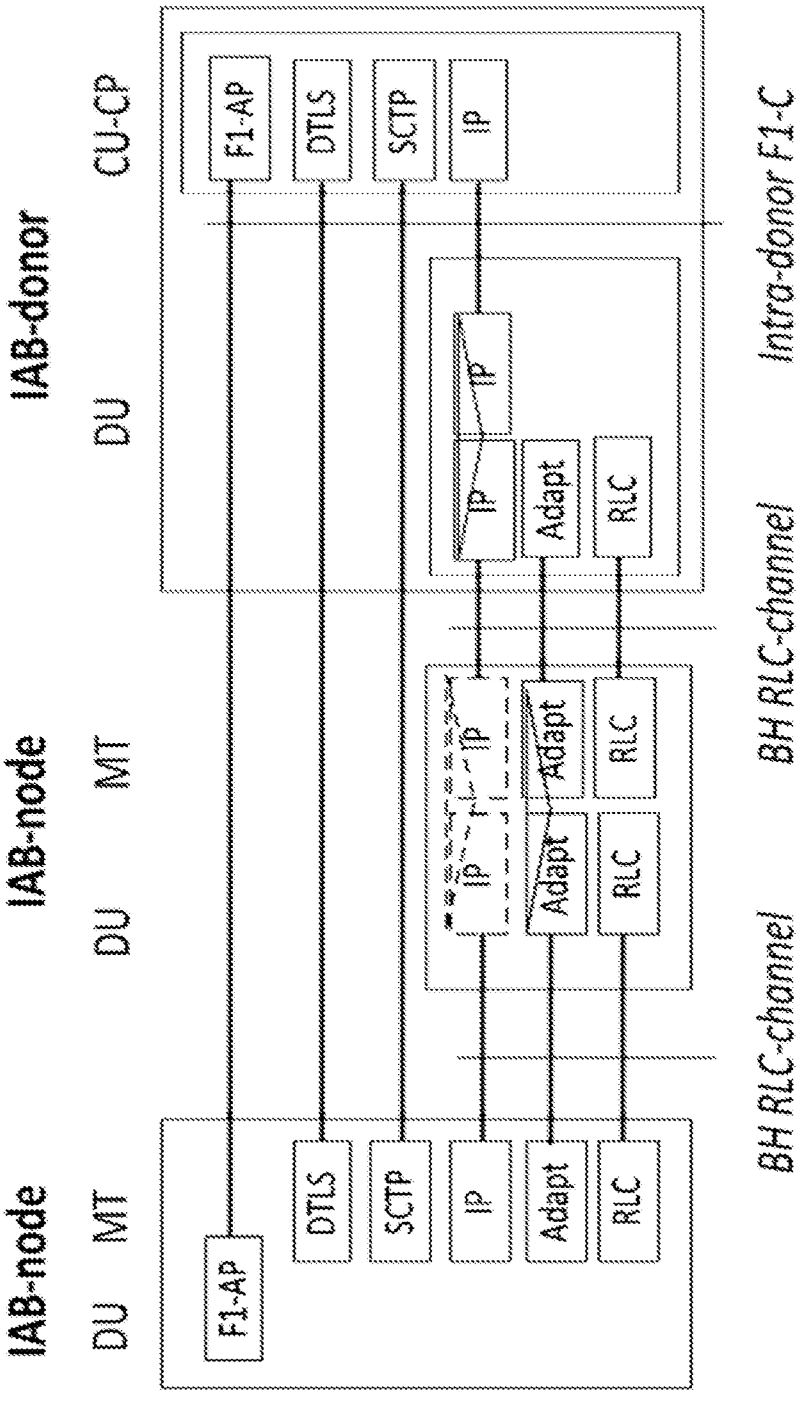
Figure 4:
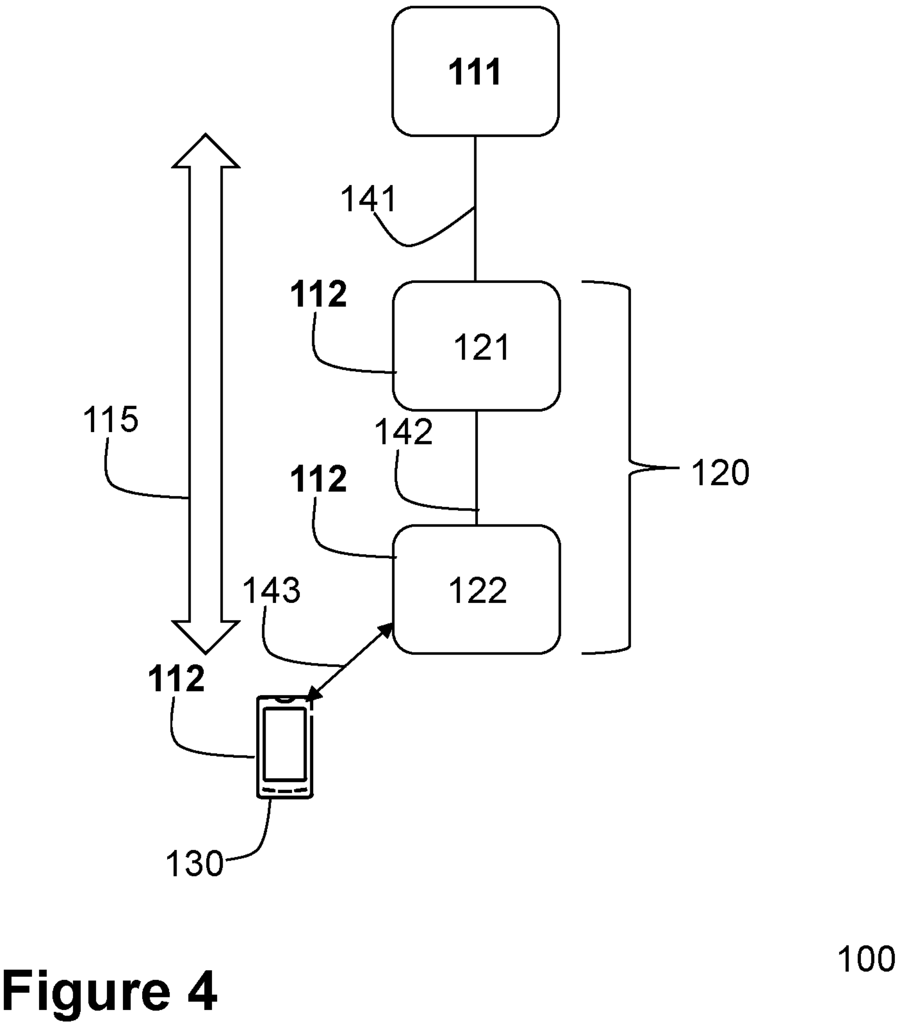
FIG. 4 is a schematic diagram illustrating a wireless communications network, according to embodiments herein.

FIG. 4 depicts seven non-limiting examples of a wireless communications network 100, which may be a wireless communications network, sometimes also referred to as a wireless communications system, cellular radio system, or cellular network, in which embodiments herein may be implemented. The wireless communications network 100 may typically be a 5G system, 5G network, NR-U or Next Gen System or network, Long-Term Evolution (LTE) system, or a combination of both. The wireless communications network 100 may alternatively be a younger system than a 5G system. The wireless communications network 100 may support technologies such as, particularly, LTE-Advanced/LTE-Advanced Pro, e.g., LTE Frequency Division Duplex (FDD), LTE Time Division Duplex (TDD), LTE Half-Duplex Frequency Division Duplex (HD-FDD), LTE operating in an unlicensed band. The wireless communications network 100 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). In particular embodiments, such as that depicted in FIG. 4, the wireless communications network 100 may be an Integrated Access and Backhaul (IAB) network. Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of nodes, whereof a first node 111, and a second node 112 are depicted in the non-limiting example of FIG. 4. The wireless communications network 100 may comprise one or more second nodes 112. In the non-limiting example of FIG. 4, the wireless communications network 100 comprises three second nodes 112.

The first node 111 may be understood as a node in the wireless communications network 100 that may send a grant to a wireless device, such as the wireless device 130 described below. The first node 111 may be a network node, e.g., a radio network node such as a gNB, such as the network node 110 described below. In particular examples, the first node 111 may be a donor node within the wireless communications network 100. The donor node may be understood to be, e.g., a node having a connection, e.g., a wired backhaul connection, to a core network node of the wireless communications network 100, which is not depicted in FIG. 4 to simplify the Figure. In some particular embodiments, the first node 111 may be a CU of a donor node, e.g., an IAB-Donor CU. In other particular embodiments, the first node 111 may be a DU or the donor node, e.g., an IAB-Donor DU.

The second node 112 may be understood as a node in the wireless communications network 100 that may receive, e.g., detect or detect and decode, the grant sent by the first node 111 to the wireless device. The second node 112 may therefore be one of the wireless device itself, e.g., the wireless device 130 described below, or a relay node between the first node 111 and the wireless device 130, that any of the first node 111 and the wireless device 130 may use when sending information to each other, and/or receiving information from each other. For the examples wherein the second node 112 may be a relay node, the second node 112 may be one of an intermediate node and an access node. The second node 112 may be understood to be one or more hops away from any of the first node 111 and the wireless device 130, which may be provided as a reference. ‘Intermediate’ and ‘access’ may be understood as a role that a node, e.g., an IAB node, may play with respect to UEs, e.g., the wireless device 130. One node, e.g., IAB node, may be the access node to its connected UEs, e.g., the wireless device 130 but may be an intermediate node to UEs of its child nodes, e.g., IAB nodes.

As depicted in the non-limiting examples of FIG. 4, the wireless communications network 100 may comprise a multi-hop deployment, wherein the first node 111 and the wireless device 130 may be separated by a multi-hop path 115 comprising a plurality of relay nodes 120. In the non-limiting example of FIG. 4, the plurality of relay nodes 120 comprises two different relay nodes, a first relay node 121, one-hop away from the first node 111, and two-hops away from the wireless device 130, and a second relay node 122, two-hops away from the first node 111 and one-hop away from the wireless device 130. In the multi-hop deployment, the first node 111 may be a donor node.

Any of the first node 111, and any of the relay nodes in the plurality of relay nodes 120 may be a radio network node, such as a radio base station, base station or a transmission point, or any other network node with similar features capable of serving a user equipment, such as a wireless device or a machine type communication device, in the wireless communications network 100. For example, any of the first node 111, and any of the relay nodes in the plurality of relay nodes 120 may be a gNB, an eNB, an eNodeB, a Home Node B, of a Home eNode B. Any of the first node 111, and any of the relay nodes in the plurality of relay nodes 120 may be of different classes, such as, e.g., macro base station (BS), home BS or pico BS, based on transmission power and thereby also cell size. In some embodiments, any of the first node 111, and any of the relay nodes in the plurality of relay nodes 120 may be implemented as one or more distributed nodes, such as virtual nodes in the cloud, and they may perform their functions entirely on the cloud, or partially, in collaboration with one or more radio network nodes.

It may be understood that the wireless communications network 100 may comprise more nodes, and more or other multi-hop arrangements, which are not depicted in FIG. 4 to simplify the Figure.

The wireless communications network 100 covers a geographical area which may be divided into cell areas, wherein each cell area may be served by any of the first node 111, and any of the relay nodes in the plurality of relay nodes 120, although, any of the first node 111, and any of the relay nodes in the plurality of relay nodes 120 may serve one or several cells. In the non-limiting example of FIG. 4, the cells are not depicted to simplify the Figure.

A wireless device 130, or more, may be located in the wireless communication network 100. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The first node 111 may be configured to communicate in the wireless communications network 100 with the first relay node 121 over a first link 141. The first relay node 122 may be configured to communicate in the wireless communications network 100 with the wireless device 130 over a second link 142. The second relay node 122 may be configured to communicate in the wireless communications network 100 with the wireless device 130 over a third link 143.

Each of the first link 141, the second link 142, and the third link 143 may be, e.g., a radio link.

A connection between any two given nodes in the communications network may follow one or more paths, e.g., in different moments in time, if at least one of the first node 111, any of the relay nodes in the plurality of nodes 120 and the wireless device 130 may move.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

In general, the usage of "first", "second" and "third", etc., herein may be understood to be an arbitrary way to denote different elements or entities and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Figure 5:
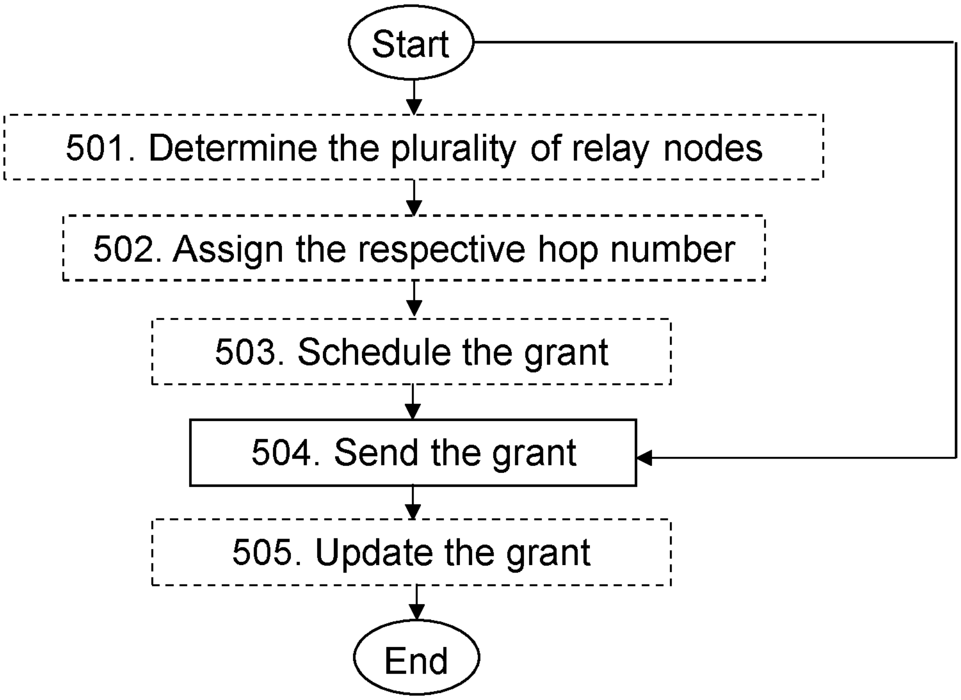
FIG. 5 depicts a flowchart of a method in a first node, according to embodiments herein.

Embodiments of a computer-implemented method, performed by the first node 111, will now be described with reference to the flowchart depicted in FIG. 5. The method may be understood to be for sending a grant to the wireless device 130 comprised in a multi-hop path 115 comprising the plurality of relay nodes 120. The first node 111, the plurality of relay nodes 120 and the wireless device 130 operate in the wireless communications network 100. The wireless communications network 100 may be understood to be a multi-hop deployment. In some examples, the wireless communications network 100 may be an Integrated Access and Backhaul (IAB) network.

The method may comprise one or more of the following actions. In some embodiments all the actions may be performed. In other embodiments, one or more actions may be performed. One or more embodiments may be combined, where applicable. All possible combinations are not described to simplify the description. Some actions may be performed in a different order than that shown in FIG. 5. In FIG. 5, actions which may be optional in some examples are depicted with dashed boxes. In some examples, Action 504 is performed. In other examples, any of the other Actions may be additionally performed.

Action 501

During the course of communications in the wireless communications network 100, the first node 111 or the wireless device 130 may need to send data or information to each other, either in the DL, from the first node 111 to the wireless device 130, or in the UL, from the wireless device 130 to the first node 111. For that purpose, the first node 111 may need to allocate resources to the information to be sent in the DL or in the UL, and eventually send a grant to the wireless device 130 indicating the allocated resources. Since the wireless device 130 may be comprised in a multi-hop deployment, the first node 111 may first need to determine which path it may use to send or receive the information to or from the wireless device 130, respectively.

Accordingly, in this Action 501, the first node 111 may determine which may be the plurality of relay nodes 120 in the multi-hop path 115.

Determining may be understood as calculating, deriving or selecting.

To select which may be the plurality of relay nodes 120 in the multi-hop path 115, the first node 111 may first employ various algorithms on how to find the number of relay nodes between the first node 111 and the wireless device 130. In one example, the first node 111 may ask the wireless device 130 to send the strongest reference signal, so that the first node 111 may sense or hear the signal. It may happen that the wireless device 130 may not be allowed to transmit with that much power for normal communication, except for reference signals, so that the first node 111 may be able to estimate the location of the wireless device 130. The first node 111 may then estimate the location of the wireless device 130 based on one or more measurements such as, Signal to Noise Ratio (SNR), Angle of Arrival (AoA), etc. Further, the first node 111 may know the locations of the relay nodes in the plurality of relay nodes 120, referred to herein simply as "RNs", as they may be static or connected to the first node 111 with an ethernet connection, or the RNs may continuously update their locations to the first node 111. The first node 111 may therefore know the location of the wireless device 130, and appropriate RNs, which may allow the best connection to the wireless device 130, that is, for example, the connection that may allow shortest path or lowest latency, or best reliability, etc. to the wireless device 130.

According to one algorithm, the wireless device 130 may broadcast its presence in the form of reference signals. If the wireless device 130 is far away from the first node 111, then all the RNs which may hear the broadcast message of the wireless device 130, may relay that message to the first node 111. The RNs may also indicate to the first node 111 with what signal strength or SNR they may have received the broadcast message of the wireless device 130 in the "relay message". The first node 111 may then be able to determine which RNs may have heard the wireless device 130 with the best SNR, and accordingly, choose that or those RNs to setup a multi-hop connection with the wireless device 130 via the multi-hop path 115.

By determining which may be the plurality of relay nodes 120 in the multi-hop path 115 in this Action 501, the first node 111 may then be enabled to determine which resources the first node 111 may need to allocate to the grant for the wireless device 130, and how it may need to design them for improved signalling efficiency, as will be described in the next actions.

Action 502

After having determine which may be the plurality of relay nodes 120 in the multi-hop path 115, in this Action 502, the first node 111 may assign a respective hop number to each of the determined relay nodes 120 in the multi-hop path 115 and the wireless device 130.

By assigning the respective hop number to each of the determined relay nodes 120 in the multi-hop path 115 and the wireless device 130 in this Action 502, the first node 111 may then be enabled to design the allocation of resources for the grant to be sent to the wireless device 130, for improved signalling efficiency, as will be described in the next action.

Action 503

In this Action 503, the first node 111 may schedule a grant. Scheduling may be understood as allocating time-frequency resources. When scheduling the grant, the first node 111 may consider that, while the grant may be sent, in the strict sense to the wireless device 130 as destination node, any of the relay nodes in the plurality of relay nodes 120 may be able to listen to, that is, receive and decode, the grant. According to embodiments herein, the first node 111 may then take advantage of this fact, and simplify the allocation of resources process, and schedule a grant that, while explicitly intended to be for the wireless device 130, may implicitly also allocate resources for the transmission to each of the plurality of relay nodes 130 determined to be comprised in the multi-hop path 115.

As will be explained in further detail next, according to embodiments herein, the wireless device 130, and the plurality of relay nodes 120 may be allocated the same resource, but at different time-offsets. The time-offset may be equivalent to a Propagation Delay (PD) between pairs nodes, where one of them may be a transmitter and other may be a receiver.

In accordance with the foregoing, the grant scheduled in this Action 503 may comprise an allocation of first time-frequency resources to the wireless device 130. The grant may also comprise an allocation of respective second time-frequency resources to each of the relay nodes 120 in the multi-hop path 115. The plurality of relay nodes 120 determined to be comprised in the multi-hop path 115 may be able to implicitly derive this allocation when receiving the grant because the grant may be also designed to comprise an indication of the multi-hop path 115. Hence, the plurality of relay nodes 120 determined to be comprised in the multi-hop path 115 may understand that grant may be also intended for them.

The first time-frequency resources and the respective second time-frequency resources may be allocated in a same transmission occasion.

Within the same occasion, each of the first time-frequency resources and the respective second time-frequency resources may have the same duration and frequency, with the exception of their allocated period of time. Hence, each of the relay nodes 120 in the multi-hop path 115 and the wireless device 130 may be scheduled a time (t), plus an offset (D), multiplied by the assigned respective hop number in Action 502. That is, the allocations may appear on two different nodes at different absolute times, however, the pattern of the allocation may otherwise be same, e.g., the size of the resources in the time and frequency domain, etc. may be the same. For example, the allocation at a RN2 with respect to a RN1 may be at the time difference equivalent to the propagation delay between RN1 and RN2. This may be understood to mean that whenever there may be a transmission from RN1, RN2 may be able to receive it after the propagation delay.

The grant time for the wireless device 130 may be set so the plurality of relay nodes 120 may have time to relay the data in the DL or the UL.

Each of the first time-frequency resources and the respective second time-frequency may comprise a respective first subset of resources for reception and a respective second subset of resources for transmission.

Each of the respective first subset of resources for reception and the respective second subset of resources for transmission may be separated by a time gap, that is, the offset (D). That is, there may be a time-gap between the UL-DL, or SL reception-SL transmission resources in the bidirectional resource's occasion in a node. The gap may be zero or non-zero, which may be measured in Orthogonal Frequency Division Multiplexing (OFDM) symbols, slots, sub-slots, etc.

The first time-frequency resources and the respective second time-frequency resources may be allocated consecutively in time in the transmission occasion. Each of the first time-frequency resources and the respective second time-frequency may be separated in time by an offset, e.g., the offset D, so that the respective second subset of resources for transmission of a transmitter may be separated by the offset from the respective first subset of resources for reception of a receiver. In the downlink, the transmitter may be one of the relay nodes 120 in the multi-hop path 115 and the receiver may be one of: another of the relay nodes 120 in the multi-hop path 115 and the wireless device 130. In the uplink, the transmitter may be one of the relay nodes 120 in the multi-hop path 115 and the wireless device 130, and the receiver may be another of the relay nodes 120 in the multi-hop path 115.

The grant may further indicate that the allocation of the first time-frequency resources and the respective second time-frequency resources may be to be repeated periodically.

As a summary of the foregoing, in embodiments herein, the grant may comprise an allocation of periodic, or semi-persistent, or some pattern, of bidirectional resources to the plurality of relay nodes 120 (RNs) determined to be comprised in the multi-hop path 115. For simplicity, this type of grant may be referred to herein as a bidirectional semi-persistent grant, where each transmission occasion may comprise an opportunity for (SL) transmission, and an opportunity for (SL) reception. This is illustrated graphically in FIG. 7, which will be described later. Different nodes, e.g., RNs and the wireless device 130, may be allocated the same semi-persistent bidirectional resource, but at different time-offsets, which may be equivalent to the PD between pairs nodes, where one of them may be a transmitter and other may be a receiver.

In one option, the same bidirectional semi-persistent grant may be used to support multiple transmission options, which may be any of: i) direct DL transmission from the first node 111 to the wireless device 130, e.g., gNB to UE, ii) DL from the first node 111 to the wireless device 130 via the plurality of relay nodes 120, iii) direct UL transmission from the wireless device 130 to the first node 111, and iv) UL transmission from the wireless device 130 to the first node 111 via plurality of relay nodes 120.

In some examples, the resource allocation may be different at different relay nodes in the plurality of relay nodes 120 and the wireless device 130. The allocation may therefore be understood to comprise a respective size (L) of the first time-frequency resources, and the respective second time-frequency resources. This is illustrated graphically, for example, in FIG. 7. Respective indicates here that the allocation may apply, respectively, to each of the wireless device 130 and each of the relay nodes in the plurality of relay nodes 120.

This may be understood to be because, any of the plurality of relay nodes 120 may re-encode the received data e.g., with different Modulation and Coding Scheme (MCS), a Redundancy Version (RV) pattern, etc., In such scenarios, the first node 111 may indicate to the plurality of relay nodes 120 their respective resource size L±δL, even the period (P), that is the different in time between the beginning of the allocated resources to one of the relay nodes in the plurality of relay nodes 120 or the wireless device 130 and the beginning of the allocated resources to the next-hop node, may remain the same.

In some examples, the transmission and reception resource allocations in an occasion may be correlated in any of the following ways. In some examples, both transmission and reception resource may be configured with the same MCS or RV or precoders, etc. In some examples, both transmission and reception resource may have the same size within an occasion, where the parameters such as MCS, RV may be different. For e.g., the first relay node 121, "RN R1" may be receiving with MCS X and transmitting the same received data with MCS Y within the same period, see the non-limiting example of FIG. 7.

In some examples, the UL/DL/SL resources in an occasion may be allocated over TDD or FDD, or a mix of TDD and FDD.

In some examples, the UL/DL/SL resources in an occasion may be allocated over licensed spectrums, e.g., NR, or unlicensed spectrums, e.g., NR-U, or combination of both spectrums.

By scheduling the grant in this Action 503, the grant indicating the allocation of the first time-frequency resources to the wireless device 130, and the indication of the multi-hop path 115, the grant may thereby indicate the allocation of respective second time-frequency resources to each of the relay nodes 120 in the multi-hop path 115 implicitly, wherein the first time-frequency resources and the respective second time-frequency resources may be allocated in a same transmission occasion. Hence, the first node 111 may be enabled to provision resources to the wireless device 130 and the plurality of relay nodes 120 with less signalling. The first node 111 may be enabled to save resources, both processing resources, and radio resources, e.g., particularly control resources, such as, PDCCH. Hence, the first node 111 may be enabled to decrease latency, save energy resources and decrease interference.

By scheduling the grant in this Action 503, wherein each of the first time-frequency resources and the respective second time-frequency may comprise the respective first subset of resources for reception and the respective second subset of resources for transmission, the first node 111 may be enabled to perform a simplified scheduling, thereby saving further processing resources, and enabling to save radio resources. Hence, the first node 111 may be enabled to further decrease latency, further save energy resources and further decrease interference.

Action 504

Once the first node 111 may have scheduled the grant, the first node 111 may then send the grant towards the wireless device 130 via the multi-hop path 115. Embodiments herein may use a single scheduling message for the wireless device 130, e.g., a UE, which may be connected to the first node 111, e.g., an eNB, via the plurality of relay nodes 120, in other words, the multi-hop path 115. To enable this, a new multi-hop indication may be included in the grant message, which indication may be used in both directions, DL and UL, and by the side-link (SL). This indication may be understood to mean that the plurality of relay nodes 120, that is, the RNs of the specific multi-hop path 115, may also read and use the grant. According to the foregoing, in this Action 504, the first node 111 may send the grant to the wireless device 130. The grant indicates an allocation of first time-frequency resources to the wireless device 130. The grant also indicates the indication of the multi-hop path 115. The grant thereby indicates the allocation of the respective second time-frequency resources to each of the relay nodes 120 in the multi-hop path 115. The first time-frequency resources and the respective second time-frequency resources are allocated in a same transmission occasion.

The sent grant may be the scheduled grant in Action 503. Sending may be understood as e.g., transmitting.

In some embodiments, the indication may further indicate the respective hop number for each of the relay nodes 120 in the multi-hop path 115, as e.g., assigned in Action 502. As an example, it may be assumed that there are two (2) RNs and thus 3 hops in total in the multi-hop path 115, from the first node 111, to the wireless device 130. The first node 111 may then send a normal grant to the wireless device 130, but with the multi-hop indication for this multi-hop path 115. This indication may be, for example, a specific path ID, or group ID, so the plurality of relay nodes 120, and the wireless device 130 may know they may need to listen to the grant message. In this message, only the wireless device 130 grant time may be specified, as normal. However, the plurality of relay nodes 120 may be implicitly scheduled, since they may understand this grant may be for the path ID they belong to, that is the identifier of the multi-hop path 115, as well as the hop number they have been assigned to in Action 502. For example, an RN with hopNumber==1 such as the first relay node 121 in FIG. 4, may deduce that it may expect to receive data before the wireless device 130, in the event of a DL grant. The time may be enabled to be calculated by the respective received as MaxHopNumber minus the assigned RN hopNumber, in this example 3*D−(3*D−hopNumber*D)=2*D TTIs before the actual wireless device 130 may be scheduled.

For the UL, when the first node 111 may receive a multi-hop scheduling request (SR) from the wireless device 130, the principle may be understood to be the same as in the DL. That is, the first node 111 may schedules the wireless device 130 for a specific path such as the multi-hop path 115 using multi-hop, and implicitly all relay nodes in this path, that is, the plurality of relay nodes 120, may understand how they may be scheduled on SL and UL, based on their hop number, e.g., as assigned in Action 502.

The grant, that is, the multi-hop, bidirectional semi-persistent, grant may be transmitted in several ways.

The bidirectional resource may be activated by following methods to a given node, any RN of the plurality of relay nodes 120, and/or the wireless device 130: a) single DCI, b) RRC, c) single DCI plus RRC, d) multiple DCIs, where one DCI may carry allocation information in one direction, e.g., UL, and other allocation information for opposite direction, e.g., say DL, e) point d plus RRC, f) multiple DCIs plus RRC, where one DCI may carry partial information for one or both directions, and g) point f plus RRC.

Hence, with either of the above options, the first node 111 may provide any of the relay nodes in the plurality of relay nodes 120 with reception resource allocation and transmission resource allocation. For example, using option a), and taking as example in FIG. 7, the first node 111 may send a single DCI to RN R1 which may comprise DL reception allocation and SL transmission allocation.

According to the foregoing, in some embodiments, the sending in this Action 504 may be performed in at least one of: a single DCI message, and a group-common DCI message.

As stated earlier, in some examples, the relay nodes and the wireless device 130 may be allocated the same resource. However, their resources may be understood to appear at different times, due to the propagation delay.

In some examples, the resource allocation may be sent via group-common DCI to multiple RNs and the end wireless device 130, where the resource pattern may be same, but each node may be provided with different time offsets in the same group-common DCI.

In some examples, if the wireless device 130 or one of the relay nodes in the plurality of relay nodes 120 which may be out of coverage, referred to herein as an 'out of coverage node', cannot hear the first node 111 directly, then this bidirectional resource allocation may be forwarded by another relay node in the plurality of relay nodes 120 which may be in coverage, and which may be referred to herein as 'in coverage node', which may possess this bidirectional resource allocation, it may have received from the first node 111. The 'out of coverage node', once it may receive this bidirectional resource allocation, may set its time offset equivalent to the PD between this receiving, 'out of coverage node', and the transmitting 'in coverage node'.

By sending the grant in this Action 504, the grant indicating the allocation of the first time-frequency resources to the wireless device 130, and the indication of the multi-hop path 115, the grant may thereby indicate the allocation of respective second time-frequency resources to each of the relay nodes 120 in the multi-hop path 115 implicitly, wherein the first time-frequency resources and the respective second time-frequency resources are allocated in a same transmission occasion. That is, the first node 111 may enable the wireless device 130 to receive the grant, and the replay nodes in the plurality of nodes 120 to derive their respective allocation. Hence, the first node 111 may provision resources to the wireless device 130 and the plurality of relay nodes 120 with less signalling. The first node 111 may therefore save resources, both processing resources, and radio resources, e.g., particularly control resources, such as, PDCCH. Hence, the first node 111 may decrease latency, save energy resources and decrease interference.

By the sending the grant in this Action 504, wherein each of the first time-frequency resources and the respective second time-frequency may comprise the respective first subset of resources for reception and the respective second subset of resources for transmission, the first node 111 may be enabled to perform a simplified provision of the grant, thereby saving further resources, both processing resources, and radio resources. Hence, the first node 111 may be enabled to further decrease latency, further save energy resources and further decrease interference.

Action 505

In some examples, the scheduled grant may correspond to an allocation for dynamic transmission instead of a semi-persistent allocation. This may be understood to mean that the first node 111 may allocate a bidirectional grant to the relay nodes in the plurality of relay nodes 120 and the end wireless device 130.

In some examples, the number of relay nodes in the plurality of relay nodes 120 may be increased or decreased. For example, for transmitting n-th packet on x-th occasion, two relay nodes may be used, whereas for transmitting m-th packet on y-th occasion, one relay node may be used, if e.g., the wireless device 130 has moved. In yet another example, for transmitting the k-th packet on z-th occasion, no relay nodes may be used, that is, the first node 111 may transmit a packet/Transport Block (TB) directly to the wireless device 130.

The bidirectional resources may be configured, for example, for N RNs and the wireless device 130. At a time instant, if the wireless device 130 may need M RNs to support a communication between the first node 111 and the wireless device 130, where M≤N, then only M RNs may be allowed to transmit on the configured resources. This may be useful, for example if the wireless device 130 is mobile in a geographical area, e.g., if it may be a robot moving in factory, and the first node 111 may configure all the prospective plurality of relay nodes 120 in one go. When the robot moves, and, if needed, sometimes M1 RNs, or sometimes M2 RNs, depending on the distance between the wireless device 130 and the first node 111, then only those RNs in the plurality of relay nodes 120 that may be needed may be activated with a fast signaling, without the need to communicate to these RNs all the configuration, as it may have already been done earlier. This may be understood to enable fast activation.

To enable such adaptation of the allocated resources, in this Action 505, the first node 111 may update the sent grant in Action 504, by performing at least one of the following options.

According to a first option a), the first node 111 may update the sent grant by activating or deactivating one or more nodes of the plurality of nodes 120.

In one embodiment, a given RN in the plurality of nodes 120 may be provided with a bidirectional grant, where this RN, according to Action 505, may be sent an additional command to indicate whether the RN may be enabled or disabled to use the bidirectional resource for a hop transmission and/or reception. This may enable faster scheduling, as the first node 111 may send the resource allocation a priori, that is, in the beginning, and enable to use it later in time, when the wireless device 130 may be mobile. Then, this RN may or may not be needed as part of multi-hop communication. That is, for example, if the RN becomes a part of multi-hop communication, then the first node 111 may send a DCI to enable the RN to use the already sent/stored bidirectional grant, and/or, if the RN is not part of the multi-hop communication, then the first node 111 may send a disable command via DCI to restrict the RN over the bidirectional grant for the indicated multi-hop communication.

In some examples, the relay nodes in the plurality of relay nodes 120 between the first node 111 and the wireless device 130 may be increased or decreased due to changing channel conditions, shadow fading, mobility of the wireless device 130, or simply the delay between two nodes may increase or decrease, even if the number of RNs may remain same. Hence, whenever a RN may be added or removed, or the delay between two transmitter-receiver pair may be changed, the first node 111 may update the sent grant. In some examples, due to changes in the channel, or the changes in the number of relay nodes, the bidirectional pattern may be updated in the following ways. In some examples, the size, e.g., L may remain the same, but the reference allocation with respect to the first node 111 transmission may be updated, see FIG. 11, which will be described later. In other examples, both the size, e.g., L and the reference allocation with respect to the first node 111 transmission may be updated.

According to a second option b), the first node 111 may update the sent grant by changing the respective size (L) of any of the first time-frequency resources, and the respective second time-frequency resources.

According to a third option c), the first node 111 may update the sent grant by changing the offset for at least one of the replay nodes 120 and the wireless device 130.

The first node 111 may set conditions on any of these changes. For example, a condition may be that if the delay changes by 10% or more, for instance, the scheduling pattern may remain same; however, the scheduling pattern at the affected receiving nodes may need to be aligned with respect to the transmitting node. For any transmitter-receiver pair, which may have no substantial change in propagation delay between them, there may be no need to update the alignment times at the receiving node.

According to a fourth option d), the first node 111 may update the sent grant by changing the indication of the multi-hop path 115, e.g., if the number of relay nodes in the plurality of relay nodes 120 may have changed, or a different multi-hop path may altogether be changed.

The updates may be sent using DCI or RRC messaging.

By updating the sent grant in this Action 505, the first node 111 may be enabled to dynamically adapt the grant to changes in the multi-hop path 115, while still enabling to obtain the advantages of the simplified provision of the grant. The first node 111 may thereby be enabled to handle different paths to the wireless device 130, and with a faster, simpler, scheduling process. Moreover, the first node 111 may be enabled to provision resources to the wireless devices 130 and the plurality of relay nodes 120, flexibly, and with less signalling. The first node 111 may be enabled to save resources, both processing resources, and radio resources, e.g., particularly control resources, such as, PDCCH. Hence, the first node 111 may be enabled to decrease latency, save energy resources and decrease interference.

By each of the first time-frequency resources and the respective second time-frequency comprising the respective first subset of resources for reception and the respective second subset of resources for transmission, the first node 111 may be enabled to perform a simplified dynamic scheduling, thereby saving further resources, both processing resources, and radio resources. Hence, the first node 111 may be enabled to further decrease latency, further save energy resources and further decrease interference.

Figure 6:
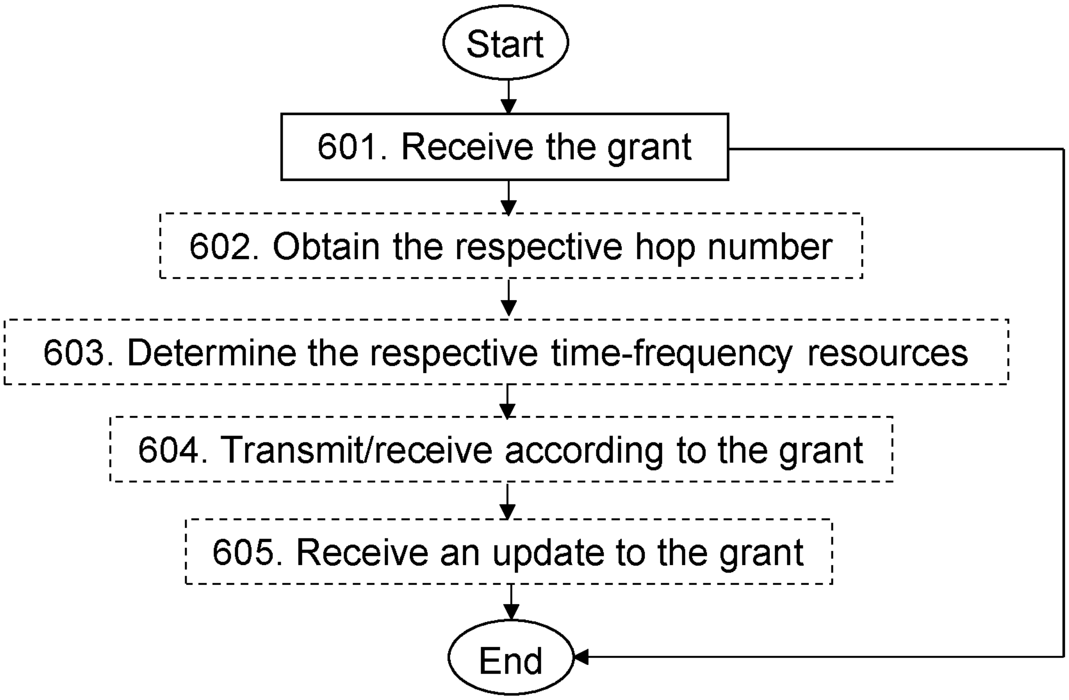
FIG. 6 depicts a flowchart of a method in a second node, according to embodiments herein.

Embodiments of a computer-implemented method, performed by the second node 112, will now be described with reference to the flowchart depicted in FIG. 6. The method may be understood to be for receiving a grant from the first node 111. The second node 112 may be one of: a) the wireless device 130 comprised in the multi-hop path 115 comprising the plurality of relay nodes 120 and b) one of the relay nodes in the plurality of relay nodes 120. The wireless device 130, the plurality of relay nodes 120 and the first node 111 operate in the wireless communications network 100.

The method may comprise one or more of the following actions. In some embodiments all the actions may be performed. In other embodiments, one or more actions may be performed. One or more embodiments may be combined, where applicable. All possible combinations are not described to simplify the description. Some actions may be performed in a different order than that shown in FIG. 6. In FIG. 6, actions which may be optional in some examples are depicted with dashed boxes. In some examples, Action 601 is performed. In other examples, any of the other Actions may be additionally performed. The detailed description of some of the following corresponds to the same references provided above, in relation to the actions described for the first node 111 and will thus not be repeated here. For example, the wireless communications network 100 may be understood to be a multi-hop deployment. In some examples, the wireless communications network 100 may be an Integrated Access and Backhaul (IAB) network.

Action 601

In this Action 601, the second node 112 receives the grant from the first node 111. The grant indicates the allocation of first time-frequency resources to the wireless device 130. The grant also indicates the indication of the multi-hop path 115. The grant thereby indicates the allocation of respective second time-frequency resources to each of the relay nodes 120 in the multi-hop path 115. The first time-frequency resources and the respective second time-frequency resources are allocated in the same transmission occasion.

In some embodiments, at least one of the following options may apply. According to the first option a) each of the first time-frequency resources and the respective second time-frequency may comprise the respective first subset of resources for reception and the respective second subset of resources for transmission. According to the second option b) each of the first time-frequency resources and the respective second time-frequency resources may be the same in duration and frequency, with the exception of their allocated period of time. According to the third option c), each of the respective first subset of resources for reception and the respective second subset of resources for transmission may be separated by a time gap.

The first time-frequency resources and the respective second time-frequency resources may be allocated consecutively in time in the transmission occasion. Each of the first time-frequency resources and the respective second time-frequency may be separated in time by the offset, e.g., the offset D, so that the respective second subset of resources for transmission of a transmitter may be separated by the offset from the respective first subset of resources for reception of a receiver. In the downlink, the transmitter may be one of the relay nodes 120 in the multi-hop path 115 and the receiver may be one of: another of the relay nodes 120 in the multi-hop path 115 and the wireless device 130. In the uplink, the transmitter may be one of the relay nodes 120 in the multi-hop path 115 and the wireless device 130, and the receiver may be another of the relay nodes 120 in the multi-hop path 115.

In some embodiments, the indication may further indicate the respective hop number for each of the relay nodes 120 in the multi-hop path 115, as e.g., assigned in Action 602.

The grant may further indicate that the allocation of the first time-frequency resources and the respective second time-frequency resources may be to be repeated periodically.

In some embodiments, the sending in this Action 604 may be performed in at least one of: the single DCI message, and the group-common DCI message.

Action 602

In this Action 602, the second node 112 may obtain the respective hop number from the first node 111.

Obtaining may be understood as e.g., receiving or retrieving.

Action 603

In this Action 603, the second node 112 may determine the respective time-frequency resources, or the first time-frequency resources, based on the received grant. Each of the relay nodes 120 in the multi-hop path 115 and the wireless device 130 may be scheduled the time (t) plus the offset (D), multiplied by the assigned respective hop number. With the proviso that the second node 112 is the wireless device 130, the second node 112 may determine the first time-frequency resources. With the proviso that the second node 112 is a relay node in the plurality of relay nodes 120, the second node 112 may determine the respective time-frequency resources.

Action 604

In this Action 604, the second node 112 may transmit and/or receive, based on the determined respective time-frequency resources in Action 603.

Action 605

In this Action 605, the second node 112 may receive an update of the received grant in Action 601, by receiving an instruction to perform at least one of the following options. According to a first option a), activate or deactivate the one or more nodes of the plurality of nodes 120. According to a second option b), change the respective size (L) of any of the first time-frequency resources, and the respective second time-frequency resources. According to a third option c), change the offset for at least one of the replay nodes 120 and the wireless device 130. According to a fourth option d), change the indication of the multi-hop path 115.

Figure 7:
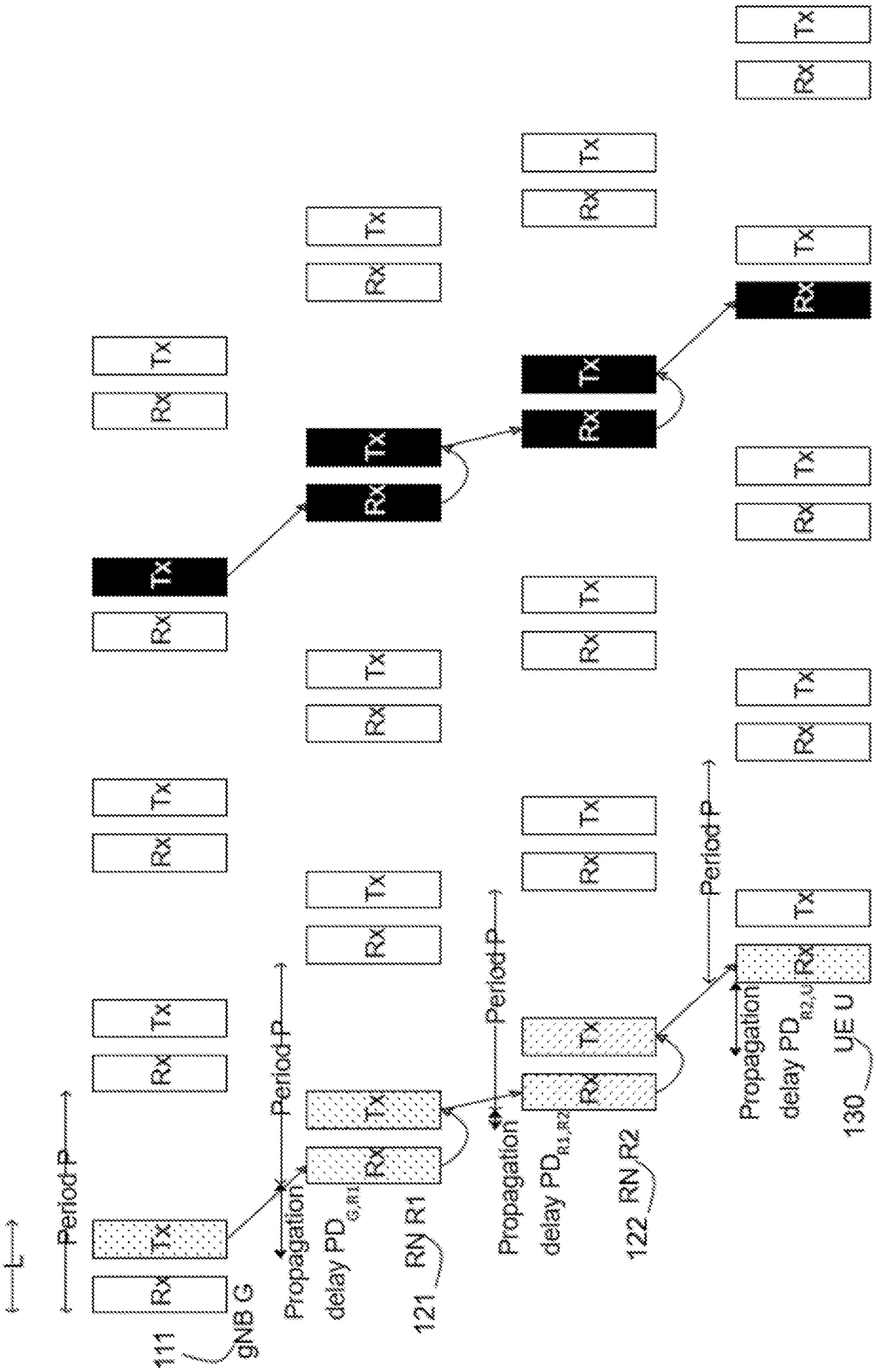
FIG. 7 is a schematic diagram depicting a non-limiting example of a resource allocation, according to embodiments herein.
Figure 8:
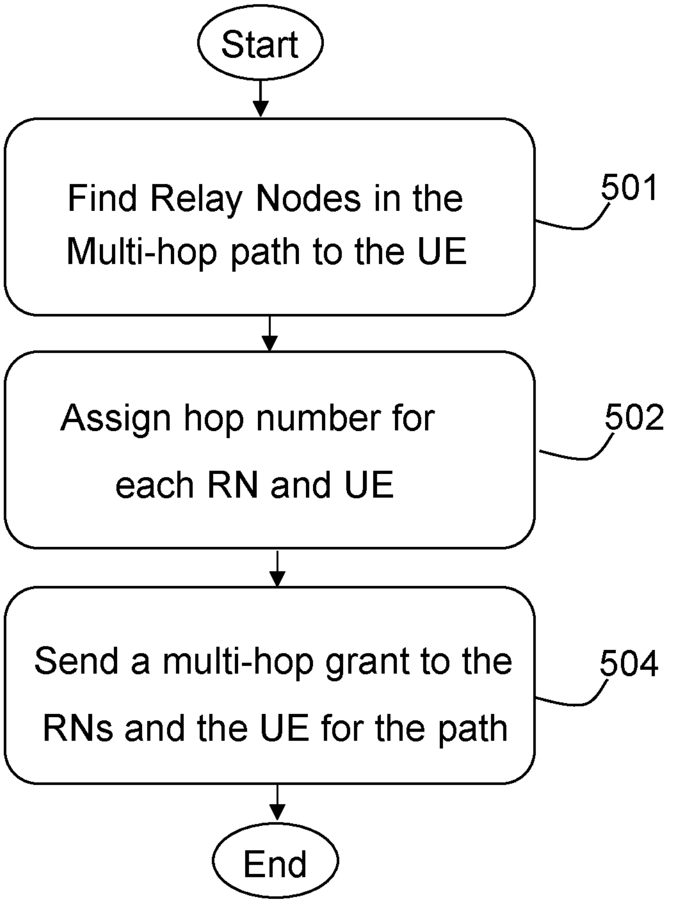
FIG. 8 depicts a flowchart of a non-limiting example of selected actions of a method in a first node, according to embodiments herein.

FIG. 7 is a schematic diagram depicting a non-limiting example of a resource allocation, according to embodiments herein. In this example, the first node 111 is a gNB, represented as "G", the wireless device 130 is a UE, represented as "U", and the plurality of relay nodes 120 comprises the first relay node 121, RN, represented as "R1", and the second relay node, RN, represented as "R2". In this example of the semi-persistent bidirectional resource allocation, each occasion comprises reception resource and transmission resource, that is, the respective first subset of resources for reception, represented as a rectangle marked with "Rx", and the respective second subset of resources for transmission, represented as a rectangle marked with "Tx". FIG. 7 shows how different nodes, e.g., the plurality of nodes 120 and the wireless device 130, may be allocated the same semi-persistent bidirectional resource, but at different time-offsets, which may be equivalent to the PD between pairs of nodes, where one of them may be a transmitter and other may be a receiver. Each PD between pairs of nodes is represented as PD, with the nodes involved indicated in the subscript. For every node depicted, the allocation is periodic, as it is repeated every period "P". The allocation comprises the respective size (L) of the first time-frequency resources, and the respective second time-frequency resources, which is the same for all nodes, and in all repetitions. Each transmission occasion may comprise an opportunity for (SL) transmission, and an opportunity for (SL) reception. Resources wherein communication takes place in this example are indicated with a dotted pattern, and by solid black rectangles, FIG. 8 depicts a flowchart of a non-limiting example of a method in the first node 111, according to embodiments herein. In accordance with Action 501, the first node 111 may find the plurality of relay nodes 120 in the multi-hop path 115 to the wireless device 130. Then, in accordance with Action 502, the first node 111 may assign the respective hop number to each of the determined relay nodes 120 in the multi-hop path 115 and the wireless device 130. Next, in accordance with Action 504, the first node 111 sends the grant to the wireless device 130 and the plurality of nodes 120, for the multi-hop path 115. The grant may be referred to as a "multi-hop grant".

Figure 9:
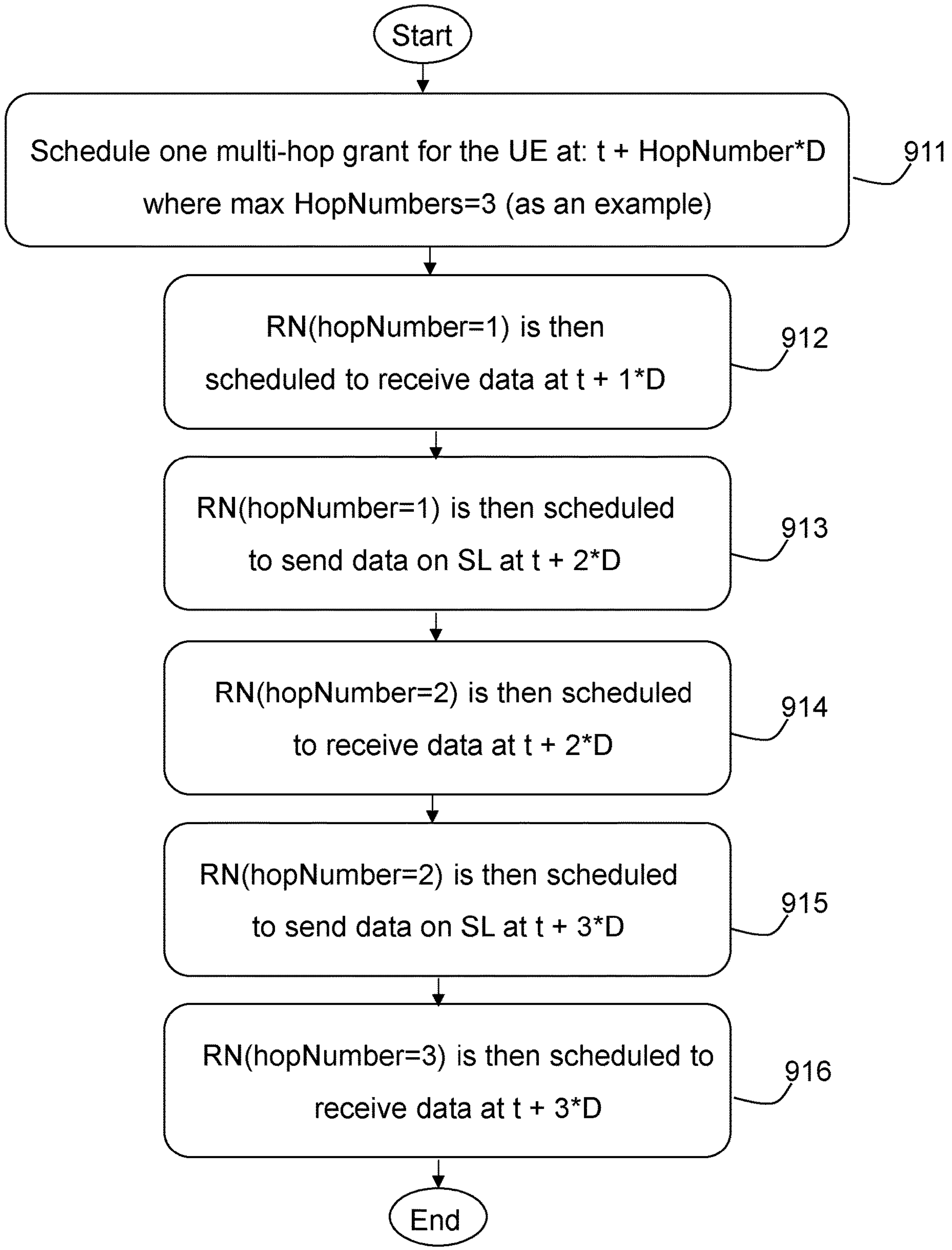
FIG. 9 depicts a flowchart of another non-limiting example of selected actions of a method in a first node, according to embodiments herein.

FIG. 9 depicts a flowchart of another non-limiting example of Action 503 in a method performed by the first node 111, according to embodiments herein. In accordance with Action 503, at Action 911, the first node 111 may schedule the grant for the wireless device 130, here, a UE. Each of the relay nodes 120 in the multi-hop path 115 and the wireless device 130 are scheduled a time, t, plus the offset, D, multiplied by the assigned respective hop number. FIG. 9 depicts a particular example of a DL single multi-hop scheduling for all RNs and the UE involved. In this example, a fixed delay D between all hops is assumed. At Action 912, the first node 111 may schedule RN (hopNumber=1) to receive data at t+1*D. At Action 913, the first node 111 may then schedule RN (hopNumber=1) to send data on SL at t+2*D. At Action 914, the first node 111 may then schedule RN (hopNumber=2) to receive data at t+2*D. At Action 915, the first node 111 may then schedule RN (hopNumber=2) to send data on SL at t+3*D. At Action 916, the first node 111 may then schedule RN (hopNumber=3) to receive data at t+3*D.

Figure 10:
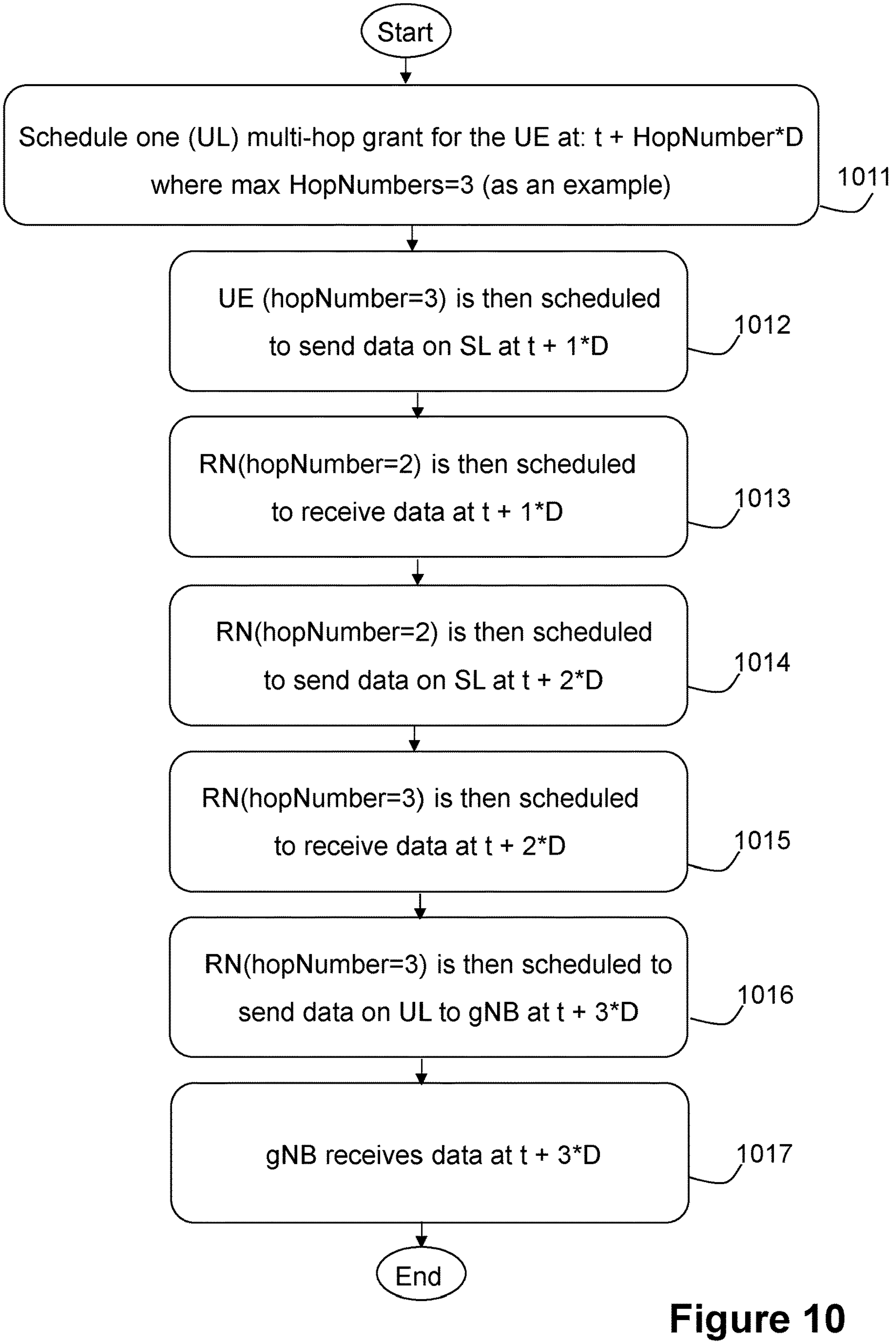
FIG. 10 depicts a flowchart of another non-limiting example of selected actions of a method in a first node, according to embodiments herein.

FIG. 10 depicts a flowchart of yet another non-limiting example of Action 503 in a method performed by the first node 111, according to embodiments herein. In accordance with Action 503, at Action 1011, the first node 111 may schedule the grant for the wireless device 130, here, a UE. Each of the relay nodes 120 in the multi-hop path 115 and the wireless device 130 are scheduled a time, t, plus the offset, D, multiplied by the assigned respective hop number. FIG. 10 depicts a particular example for the UL when the gNB receives a (multi-hop) scheduling request (SR). The principle is the same as in the DL example of FIG. 9. The first node 111 schedules the wireless device 130 for a specific path, the multi-hop path 115, using multi-hop and implicitly all relay nodes in this path understand how they are scheduled on SL and UL based on their hop number. Particularly, FIG. 10 is an example of a UL single multi-hop scheduling for all RNs in the plurality of relay nodes 120, and the wireless device 130 involved. At Action 1012, the first node 111 may schedule the wireless device 130 (hopNumber=3) to send data on SL at t+1*D. At Action 1013, the first node 111 may then schedule RN (hopNumber=2) to receive data at t+1*D. At Action 1014, the first node 111 may then schedule RN (hopNumber=2) is then scheduled to send data on SL at t+2*D. At Action 1015, the first node 111 may then schedule RN (hopNumber=3) is then scheduled to receive data at t+2*D. At Action 1016, the first node 111 may then schedule RN (hopNumber=3) is then scheduled to send data on UL to gNB at t+3*D. At Action 1017, the first node 111 may then receive data at t+3*D.

Figure 11:
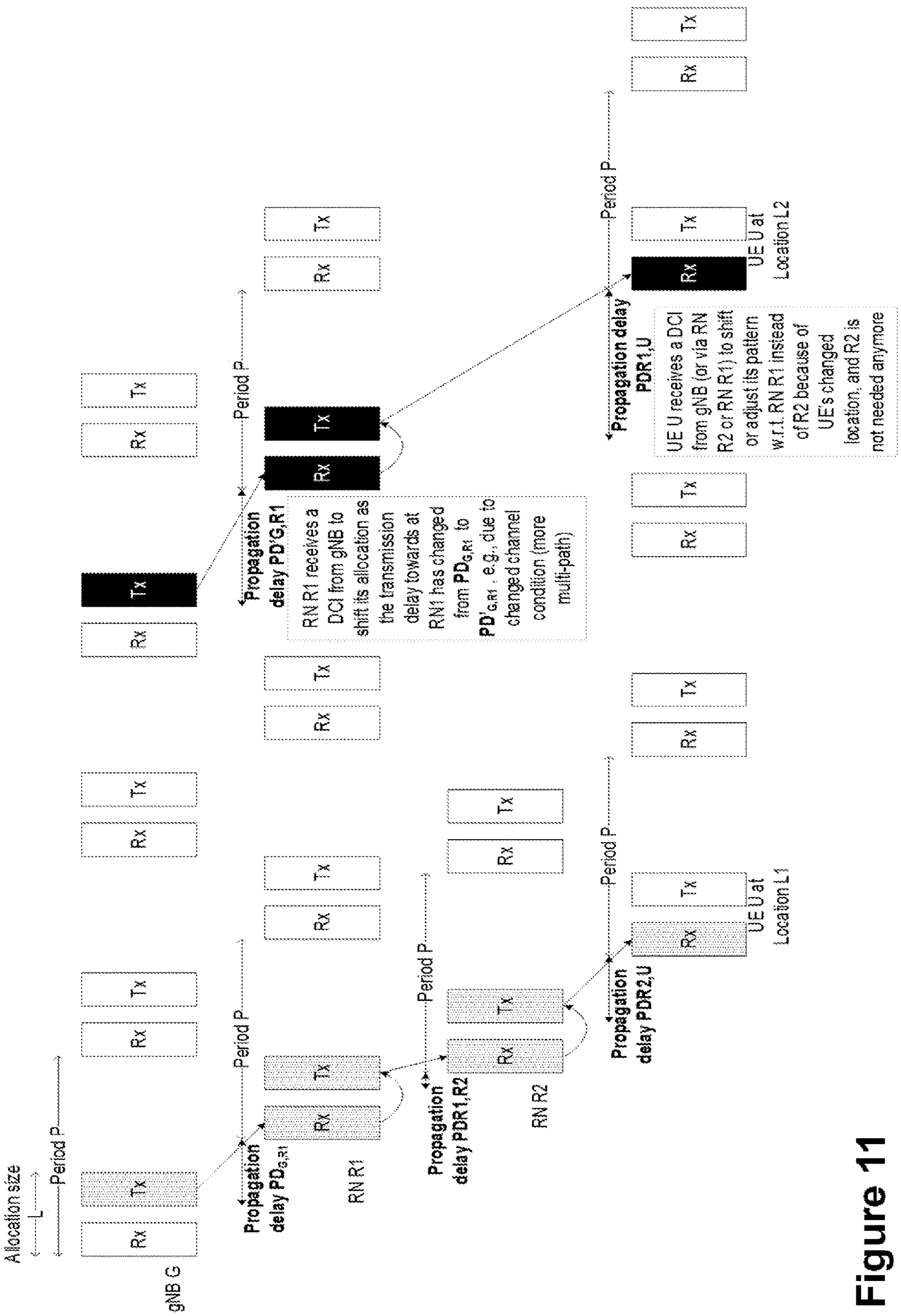
FIG. 11 is a schematic diagram depicting another non-limiting example of a resource allocation, according to embodiments herein.

FIG. 11 is a schematic diagram depicting a non-limiting example of a resource allocation, according to embodiments herein. The description of the depicted elements is equivalent to that provided for FIG. 7. In this example, the wireless device 130 moves from location L1 and L2 and accordingly the allocation pattern is updated at RN R1 and at UE U by an amount equivalent to propagation delay (PD) between the nodes. After moving to location L2, RN R1, in agreement with Action 605, receives a DCI from the first node 111 to shift its allocation, as the transmission delay towards RN1 has changed from PDG. R1 to PD'G. R1, e.g., due to changed channel condition, more multi-path. Delay may increase due to large multi-path. The same signalling may be reflected from different obstacles, and the receiver may receive them over some time-window. Then, also in agreement with Action 605, the UE U receives a DCI from the first node 111, or via RN R2 or RN R1, to shift or adjust its pattern with respect to, w.r.t. RN R1 instead of R2, because of UE's changed location, and R2 is not needed anymore.

Certain embodiments disclosed herein may provide one or more of the following technical advantage(s), which may be summarized as follows. Embodiments herein may be understood to enable to use less signaling to schedule transmissions and receptions in a multi-hop deployment scenario. Embodiments herein may be understood to enable saving of PDCCH or control resources, as bi-directional resources may be activated together, thereby being simultaneous for transmission and reception. Embodiments herein may have the further advantage of enabling simplicity. Embodiments herein may be understood to be cleaner and simpler, and independent of how RNs may be selected. The allocation pattern may be enabled or disabled if RN is activated or not. This may be understood to be because all RNs may use a same allocation pattern, except for the time offset, which may be varied. Embodiments herein may therefore also be understood to enable faster scheduling. The RNs may have a scheduled pattern stored, and they may be enabled or disabled to be a part of the hop.

Figure 12:
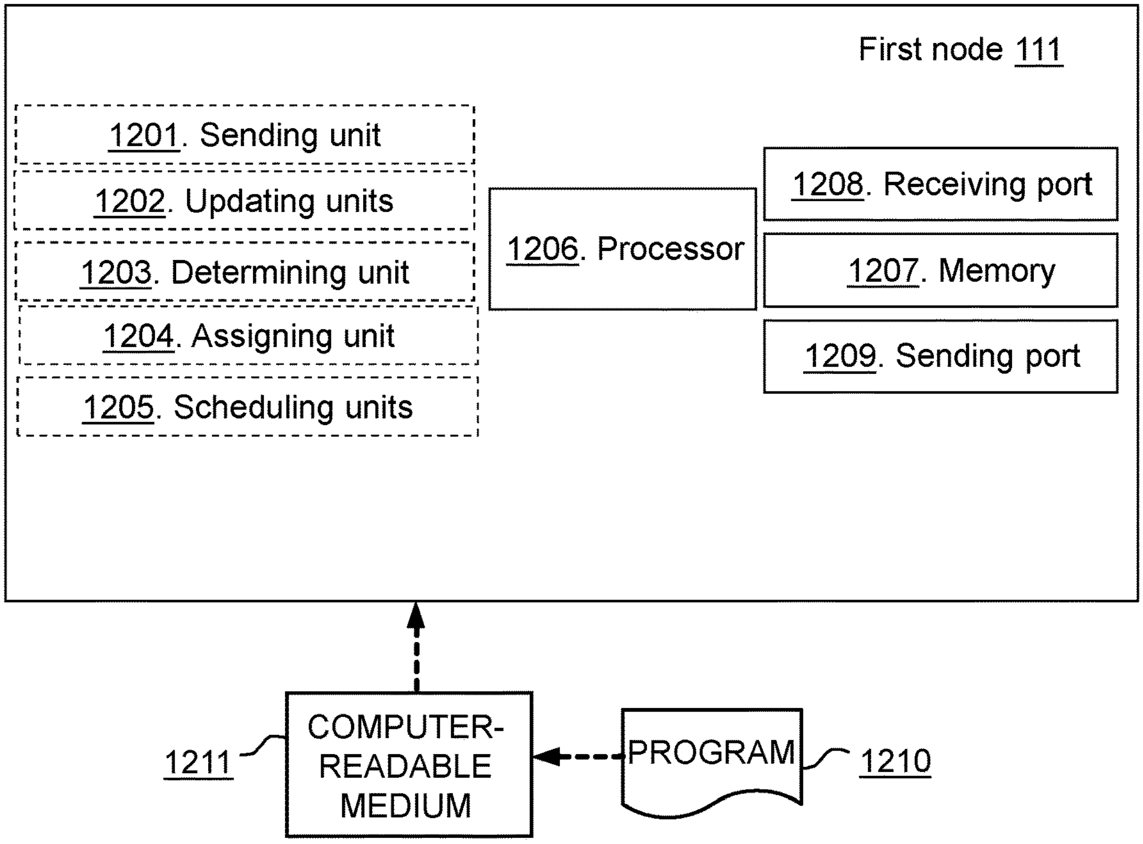
FIG. 12 is a schematic block diagram illustrating two non-limiting examples, a) and b), of a first node, according to embodiments herein.
Figure 12:
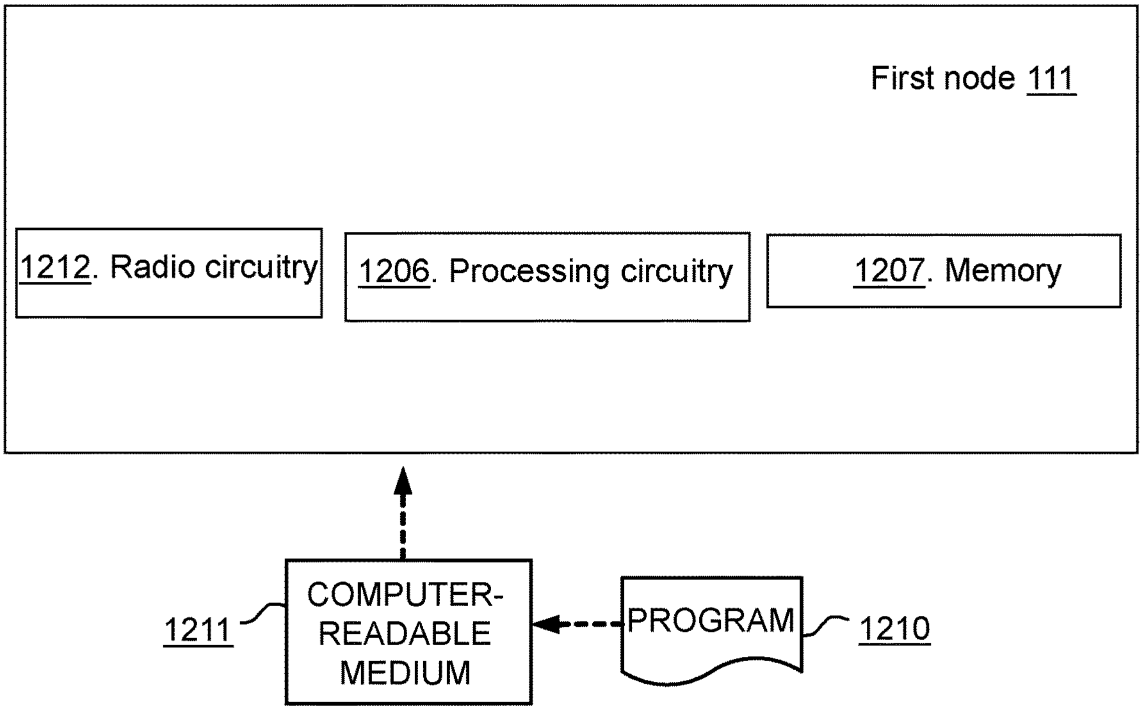

FIG. 12 depicts two different examples in panels a) and b), respectively, of the arrangement that the first node 111 may comprise. In some embodiments, the first node 111 may comprise the following arrangement depicted in FIG. 12*a*. The first node 111 may be understood to be for sending the grant to the wireless device 130. The wireless device 130 is configured to be comprised in the multi-hop path 115 configured to comprise the plurality of relay nodes 120. The first node 111, the plurality of relay nodes 120 and the wireless device 130 may be configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and will thus not be repeated here. For example, the wireless communications network 100 may be understood to be a multi-hop deployment. In some examples, the wireless communications network 100 may be an Integrated Access and Backhaul (IAB) network.

In FIG. 12, optional units are indicated with dashed boxes.

The first node 111 is configured to, e.g. by means of a sending unit 1201 within the first node 111, configured to send the grant to the wireless device 130. The grant is configured to indicate: a) the allocation of first time-frequency resources to the wireless device 130, and b) the indication of the multi-hop path 115. The grant is thereby being configured to indicate the allocation of the respective second time-frequency resources to each of the relay nodes 120 in the multi-hop path 115. The first time-frequency resources and the respective second time-frequency resources are configured to be allocated in the same transmission occasion.

In some embodiments, at least one of the following options may apply: a) each of the first time-frequency resources and the respective second time-frequency resources may be configured to comprise the respective first subset of resources for reception and the respective second subset of resources for transmission, b) each of the first time-frequency resources and the respective second time-frequency may be configured to be the same in duration and frequency, with the exception of their allocated period of time, and c) each of the respective first subset of resources for reception and the respective second subset of resources for transmission may be configured to be separated by the time gap.

In some embodiments, the first time-frequency resources and the respective second time-frequency resources may be configured to be allocated consecutively in time in the transmission occasion. Each of the first time-frequency resources and the respective second time-frequency may be configured to be separated in time by the offset, so that the respective second subset of resources for transmission of the transmitter may be configured to be separated by the offset from the respective first subset of resources for reception of the receiver. In the downlink, the transmitter may be configured to be one of the relay nodes 120 in the multi-hop path 115 and the receiver may be configured to be one of: another of the relay nodes 120 in the multi-hop path 115 and the wireless device 130. In the uplink, the transmitter may be configured to be one of the relay nodes 120 in the multi-hop path 115 and the wireless device 130, and the receiver may be configured to be another of the relay nodes 120 in the multi-hop path 115.

In some embodiments, the indication may be configured to further indicate the respective hop number for each of the relay nodes 120 in the multi-hop path 115.

In some embodiments, the grant may be further configured to indicate that the allocation of the first time-frequency resources and the respective second time-frequency resources is to be repeated periodically.

In some embodiments, the sending may be configured to be performed in at least one of: a) the single DCI message, and b) the group-common DCI message.

The first node 111 may be configured to, e.g. by means of an updating unit 1202 within the first node 111, configured to update the grant configured to be sent, by performing at least one of: a) activating or deactivating one or more nodes of the plurality of nodes 120, b) changing the respective size, L, of any of the first time-frequency resources, and the respective second time-frequency resources, c) changing the offset for at least one of the replay nodes 120 and the wireless device 130, and d) changing the indication of the multi-hop path 115.

The first node 111 may be configured to, e.g. by means of a determining unit 1203 within the first node 111, configured to determine which may be the plurality of relay nodes 120 in the multi-hop path 115.

The first node 111 may be configured to, e.g. by means of an assigning unit 1204 within the first node 111, configured to assign the respective hop number to each of the determined relay nodes 120 in the multi-hop path 115 and the wireless device 130.

The first node 111 may be configured to, e.g. by means of a scheduling unit 1205 within the first node 111, configured to schedule the grant, wherein each of the relay nodes 120 in the multi-hop path 115 and the wireless device 130 may be configured to be scheduled the time, t, plus the offset, D, multiplied by the respective hop number configured to be assigned. The grant configured to be sent may be the grant configured to be scheduled.

The embodiments herein in the first node 111 may be implemented through one or more processors, such as a processor 1206 in the first node 111 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1207 comprising one or more memory units. The memory 1207 is arranged to be used to store obtained information, store data, configurations, schedulings, and applications etc. to perform the methods herein when being executed in the first node 111.

In some embodiments, the first node 111 may receive information from, e.g., the second node 112, that is, any of the relay nodes in the plurality of relay nodes 120, the wireless device 130, the host computer 2410, and/or any of the other nodes, through a receiving port 1208. In some embodiments, the receiving port 1208 may be, for example, connected to one or more antennas in first node 111. In other embodiments, the first node 111 may receive information from another structure in the communications network 100 through the receiving port 1208. Since the receiving port 1208 may be in communication with the processor 1206, the receiving port 1208 may then send the received information to the processor 1206. The receiving port 1208 may also be configured to receive other information.

The processor 1206 in the first node 111 may be further configured to transmit or send information to e.g., the second node 112, that is, any of the relay nodes in the plurality of relay nodes 120, the wireless device 130, the host computer 2410, any of the other nodes, and/or another structure in the communications network 100, through a sending port 1209, which may be in communication with the processor 1206, and the memory 1207.

Those skilled in the art will also appreciate that the units 1201-1205 described above may refer to a combination of analog and digital circuits, and/or one or more processors configured with software and/or firmware, e.g., stored in memory, that, when executed by the one or more processors such as the processor 1206, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1201-1205 described above may be a processor 1206 of the first node 111 or may be implemented as one or more applications running on one or more processors such as the processor 1206.

Thus, the methods according to the embodiments described herein for the first node 111 may be respectively implemented by means of a computer program 1210 product, comprising instructions, i.e., software code portions, which, when executed on at least one processor 1206, cause the at least one processor 1206 to carry out the actions described herein, as performed by the first node 111. The computer program 1210 product may be stored on a computer-readable storage medium 1211. The computer-readable storage medium 1211, having stored thereon the computer program 1210, may comprise instructions which, when executed on at least one processor 1206, cause the at least one processor 1206 to carry out the actions described herein, as performed by the first node 111. In some embodiments, the computer-readable storage medium 1211 may be a non-transitory computer-readable storage medium, such as a CD ROM disc, or a memory stick. In other embodiments, the computer program 1210 product may be stored on a carrier containing the computer program 1210 just described, wherein the carrier is one of an electronic signal, optical signal, radio signal, or the computer-readable storage medium 1211, as described above.

The first node 111 may comprise a communication interface configured to facilitate communications between the first node 111 and other nodes or devices, e.g., the second node 112, that is, any of the relay nodes in the plurality of relay nodes 120, the wireless device 130, the host computer 2410, any of the other nodes, and/or another structure in the communications network 100. The interface may, for example, include a transceiver configured to transmit and receive radio signals over an air interface in accordance with a suitable standard.

In other embodiments, the first node 111 may comprise the following arrangement depicted in FIG. 12*b*. The first node 111 may comprise a processing circuitry 1206, e.g., one or more processors such as the processor 1206, in the first node 111 and the memory 1207. The first node 111 may also comprise a radio circuitry 1212, which may comprise e.g., the receiving port 1208 and the sending port 1209. The processing circuitry 1206 may be configured to, or operable to, perform the method actions according to FIG. 5 and/or FIGS. 7-11, in a similar manner as that described in relation to FIG. 12*a*. The radio circuitry 1212 may be configured to set up and maintain at least a wireless connection with any of the second node 112, that is, any of the relay nodes in the plurality of relay nodes 120, the wireless device 130, the host computer 2410, any of the other nodes, and/or another structure in the communications network 100. Circuitry may be understood herein as a hardware component.

Hence, embodiments herein also relate to the first node 111 operative to operate in the communications network 100. The first node 111 may comprise the processing circuitry 1206 and the memory 1207, said memory 1207 containing instructions executable by said processing circuitry 1206, whereby the first node 111 is further operative to perform the actions described herein in relation to the first node 111, e.g., in FIG. 5 and/or FIGS. 7-11.

Figure 13:
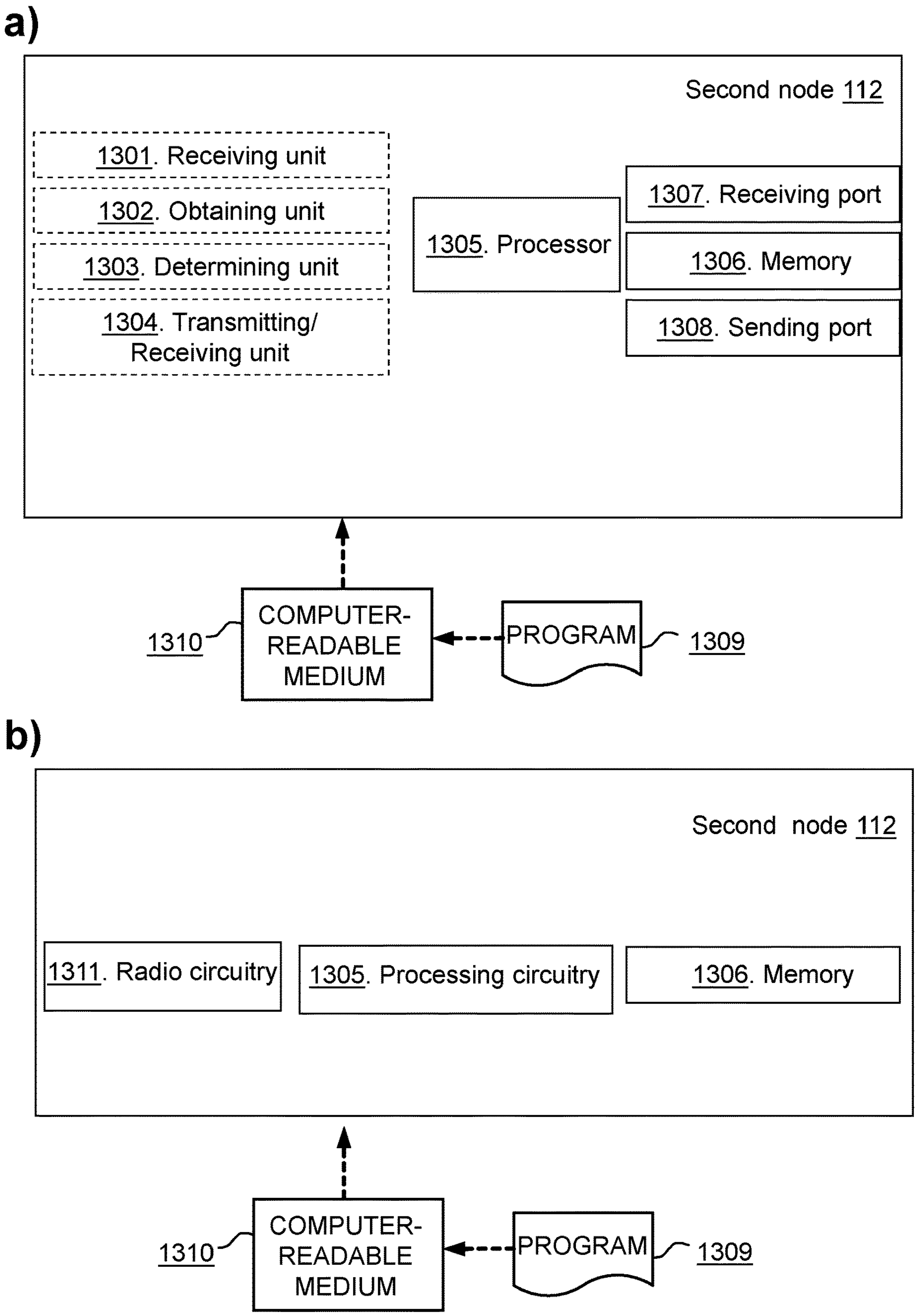
FIG. 13 is a schematic block diagram illustrating two non-limiting examples, a) and b), of a second node, according to embodiments herein.

FIG. 13 depicts two different examples in panels a) and b), respectively, of the arrangement that the second node 112 may comprise. In some embodiments, the second node 112 may comprise the following arrangement depicted in FIG. 13*a*. The second node 112 may be understood to be for receiving the grant from the first node 111. The second node 112 is configured to be one of: a) the wireless device 130 configured to be comprised in the multi-hop path 115 configured to comprise the plurality of relay nodes 120, and b) one of the relay nodes in the plurality of relay nodes 120. The wireless device 130, the plurality of relay nodes 120 and the first node 111, may be configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and the second node 112 and will thus not be repeated here. For example, the wireless communications network 100 may be understood to be a multi-hop deployment. In some examples, the wireless communications network 100 may be an Integrated Access and Backhaul (IAB) network.

In FIG. 13, optional units are indicated with dashed boxes.

The second node 112 is configured to, e.g. by means of a receiving unit 1301 within the second node 112, configured to receive the grant from the first node 111. The grant is configured to indicate: a) the allocation of first time-frequency resources to the wireless device 130, and b) the indication of the multi-hop path 115. The grant is thereby being configured to indicate the allocation of the respective second time-frequency resources to each of the relay nodes 120 in the multi-hop path 115. The first time-frequency resources and the respective second time-frequency resources are configured to be allocated in the same transmission occasion.

In some embodiments, at least one of the following options may apply: a) each of the first time-frequency resources and the respective second time-frequency resources may be configured to comprise the respective first subset of resources for reception and the respective second subset of resources for transmission, b) each of the first time-frequency resources and the respective second time-frequency may be configured to be the same in duration and frequency, with the exception of their allocated period of time, and c) each of the respective first subset of resources for reception and the respective second subset of resources for transmission may be configured to be separated by the time gap.

In some embodiments, the first time-frequency resources and the respective second time-frequency resources may be configured to be allocated consecutively in time in the transmission occasion. Each of the first time-frequency resources and the respective second time-frequency may be configured to be separated in time by the offset, so that the respective second subset of resources for transmission of the transmitter may be configured to be separated by the offset from the respective first subset of resources for reception of the receiver. In the downlink, the transmitter may be configured to be one of the relay nodes 120 in the multi-hop path 115 and the receiver may be configured to be one of: another of the relay nodes 120 in the multi-hop path 115 and the wireless device 130. In the uplink, the transmitter may be configured to be one of the relay nodes 120 in the multi-hop path 115 and the wireless device 130, and the receiver may be configured to be another of the relay nodes 120 in the multi-hop path 115.

In some embodiments, the indication may be further configured to indicate the respective hop number for each of the relay nodes 120 in the multi-hop path 115.

In some embodiments, the grant may be further configured to indicate that the allocation of the first time-frequency resources and the respective second time-frequency resources may be to be repeated periodically.

In some embodiments, the receiving may be configured to be performed in at least one of: a) the single DCI message, and b) the group-common DCI message.

The second node 112 may be configured to, e.g. by means of the receiving unit 1301 within the second node 112, configured to receive the update of the grant configured to be received, by receiving the instruction to at least one of: a) activate or deactivate one or more nodes of the plurality of nodes 120, b) change the respective size, L, of any of the first time-frequency resources, and the respective second time-frequency resources, c) change the offset for at least one of the replay nodes 120 and the wireless device 130, and d) change the indication of the multi-hop path 115.

The second node 112 may be configured to, e.g. by means of an obtaining unit 1302 within the second node 112, configured to obtain the respective hop number from the first node 111.

The second node 112 may be configured to, e.g. by means of a determining unit 1303 within the second node 112, configured to determine the respective time-frequency resources, or the first time-frequency resources, based on the grant configured to be received, wherein each of the relay nodes 120 in the multi-hop path 115 and the wireless device 130 may be configured to be scheduled the time, t, plus the offset, D, multiplied by the respective hop number configured to be assigned. With the proviso that the second node 112 is configured to be the wireless device 130, the second node 112 may be configured to determine the first time-frequency resources, and with the proviso that the second node 112 is configured to be a relay node in the plurality of relay nodes 120, the second node 112 may be configured to determine the respective time-frequency resources.

The second node 112 may be configured to, e.g. by means of a transmitting/receiving unit 1304 within the second node 112, configured to transmit and/or receive, based on the respective time-frequency resources configured to be determined.

The embodiments herein in the second node 112 may be implemented through one or more processors, such as a processor 1305 in the second node 112 depicted in FIG. 13*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1306 comprising one or more memory units. The memory 1306 is arranged to be used to store obtained information, store data, configurations, schedulings, and applications etc. to perform the methods herein when being executed in the second node 112.

In some embodiments, the second node 112 may receive information from, e.g., any of the first node 111, any other second node 112, that is, another of the relay nodes in the plurality of relay nodes 120 or the wireless device 130, the host computer 2410, and/or any of the other nodes, through a receiving port 1307. In some embodiments, the receiving port 1307 may be, for example, connected to one or more antennas in the second node 112. In other embodiments, the second node 112 may receive information from another structure in the wireless communications network 100 through the receiving port 1307. Since the receiving port 1307 may be in communication with the processor 1305, the receiving port 1307 may then send the received information to the processor 1305. The receiving port 1307 may also be configured to receive other information.

The processor 1305 in the second node 112 may be further configured to transmit or send information to e.g., any of the first node 111, any other second node 112, that is, another of the relay nodes in the plurality of relay nodes 120 or the wireless device 130, the host computer 2410, any of the other nodes, and/or another structure in the communications network 100, the host computer 2410, or any of the other nodes, or another structure in the wireless communications network 100, through a sending port 1308, which may be in communication with the processor 1305, and the memory 1306.

Those skilled in the art will also appreciate that the units 1301-1304 described above may refer to a combination of analog and digital circuits, and/or one or more processors configured with software and/or firmware, e.g., stored in memory, that, when executed by the one or more processors such as the processor 1305, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1301-1304 described above a processor, such as the processor 1305, or may be implemented as one or more applications running on one or more processors such as the processor 1305.

Thus, the methods according to the embodiments described herein for the second node 112 may be respectively implemented by means of a computer program 1309 product, comprising instructions, i.e., software code portions, which, when executed on at least one processor 1305, cause the at least one processor 1305 to carry out the actions described herein, as performed by the second node 112. The computer program 1309 product may be stored on a computer-readable storage medium 1310. The computer-readable storage medium 1310, having stored thereon the computer program 1309, may comprise instructions which, when executed on at least one processor 1305, cause the at least one processor 1305 to carry out the actions described herein, as performed by the second node 112. In some embodiments, the computer-readable storage medium 1310 may be a non-transitory computer-readable storage medium, such as a CD ROM disc, or a memory stick. In other embodiments, the computer program 1309 product may be stored on a carrier containing the computer program 1309 just described, wherein the carrier is one of an electronic signal, optical signal, radio signal, or the computer-readable storage medium 1310, as described above.

The second node 112 may comprise a communication interface configured to facilitate communications between the second node 112 and other nodes or devices, e.g., any of the first node 111, any other second node 112, that is, another of the relay nodes in the plurality of relay nodes 120 or the wireless device 130, the host computer 2410, any of the other nodes, and/or another structure in the communications network 100. The interface may, for example, include a transceiver configured to transmit and receive radio signals over an air interface in accordance with a suitable standard.

In other embodiments, the second node 112 may comprise the following arrangement depicted in FIG. 13*b*. The second node 112 may comprise a processing circuitry 1305, e.g., one or more processors such as the processor 1305, in the second node 112 and the memory 1306. The second node 112 may also comprise a radio circuitry 1311, which may comprise e.g., the receiving port 1307 and the sending port 1308. The processing circuitry 1305 may be configured to, or operable to, perform the method actions according to FIG. 6 and/or FIGS. 7-11, in a similar manner as that described in relation to FIG. 13*a*. The radio circuitry 1311 may be configured to set up and maintain at least a wireless connection with any of the first node 111, any other second node 112, that is, another of the relay nodes in the plurality of relay nodes 120 or the wireless device 130, the host computer 2410, any of the other nodes, and/or another structure in the communications network 100. Circuitry may be understood herein as a hardware component.

Hence, embodiments herein also relate to the second node 112 operative to operate in the wireless communications network 100. The second node 112 may comprise the processing circuitry 1305 and the memory 1306, said memory 1306 containing instructions executable by said processing circuitry 1305, whereby the second node 112 is further operative to perform the actions described herein in relation to the second node 112, e.g., in FIG. 6 and/or FIGS. 7-11.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Further Extensions and Variations

Figure 14:
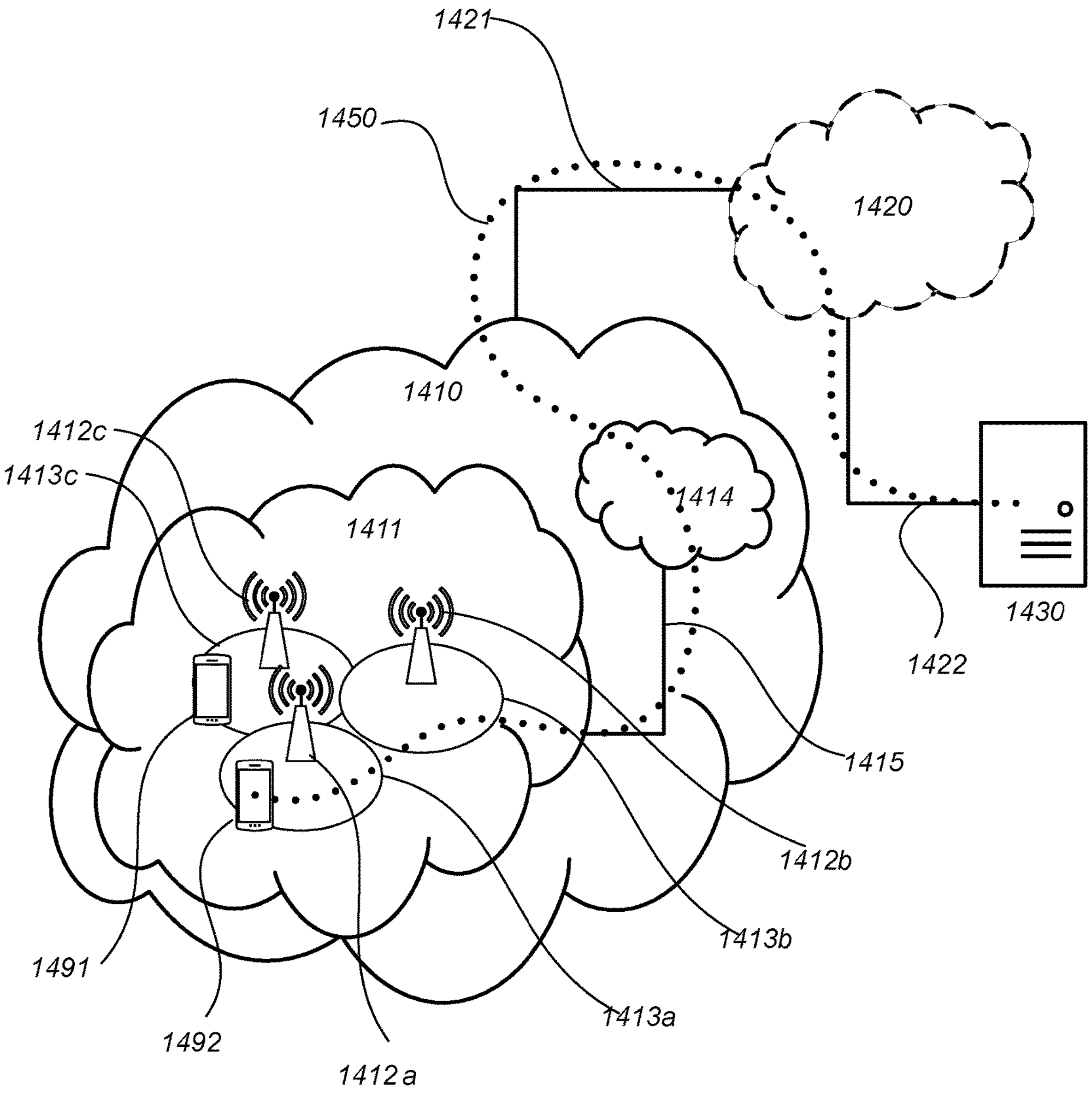
FIG. 14 is a schematic block diagram illustrating a telecommunication network connected via an intermediate network to a host computer, according to embodiments herein.

FIG. 14: Telecommunication Network Connected Via an Intermediate Network to a Host Computer in Accordance with Some Embodiments With reference to FIG. 14, in accordance with an embodiment, a communication system includes telecommunication network 1410 such as the wireless communications network 100, for example, a 3GPP-type cellular network, which comprises access network 1411, such as a radio access network, and core network 1414. Access network 1411 comprises a plurality of network nodes such as the network node 110 or any of the relay nodes in the plurality of relay nodes 120. For example, base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A plurality of wireless devices, such as the wireless device 130 are comprised in the wireless communications network 100. In FIG. 14, a first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412. Any of the UEs 1491, 1492 are examples of the wireless device 130.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430. In relation to FIGS. 15, 16, 17, 18, and 19, which are described next, it may be understood that a UE is an example of the wireless device 130, and that any description provided for the UE equally applies to the wireless device 130. It may be also understood that the base station is an example of the network node 110 or any of the relay nodes in the plurality of relay nodes 120, and that any description provided for the base station equally applies to the network node 110 or any of the relay nodes in the plurality of relay nodes 120.

Figure 15:
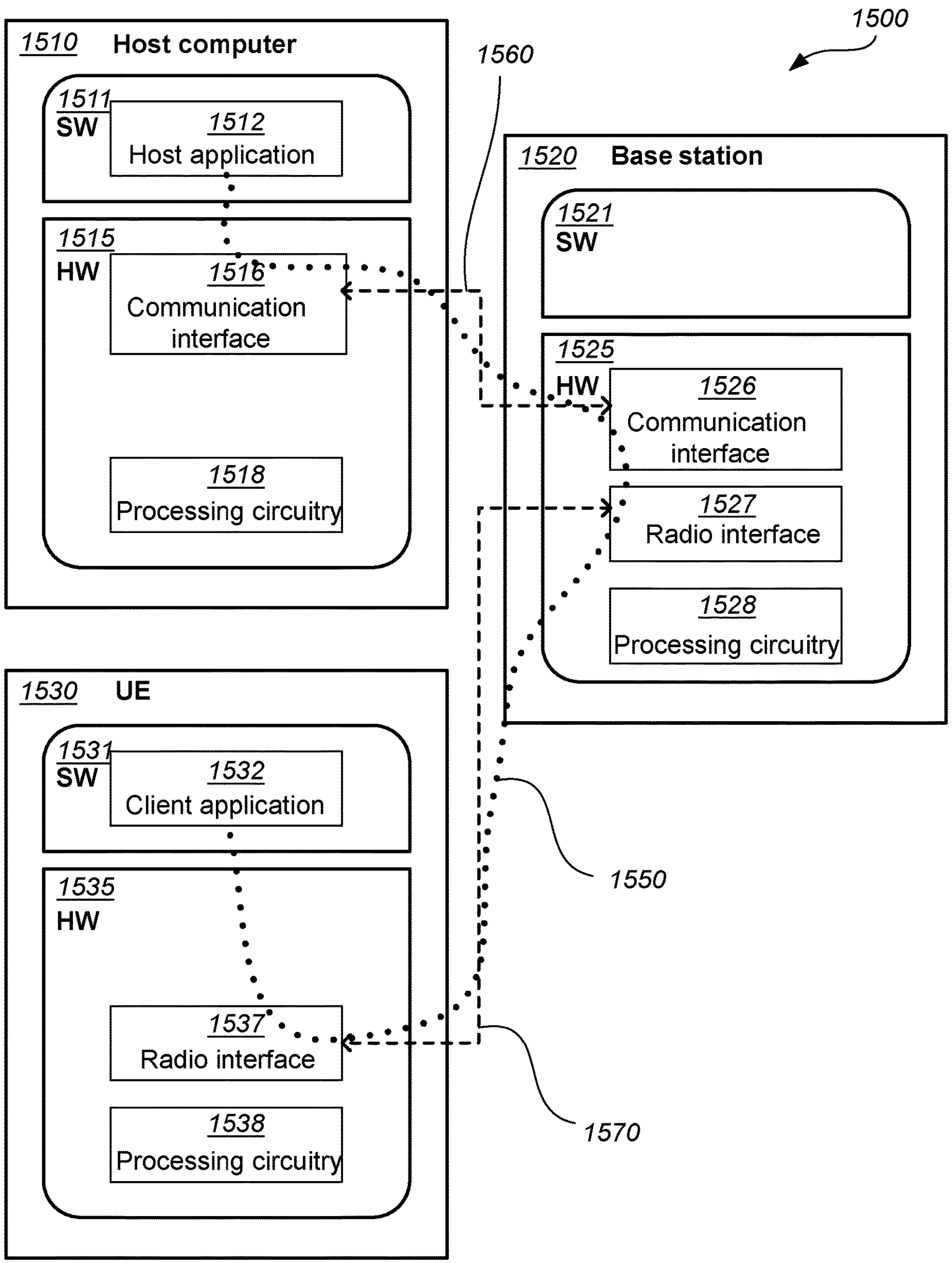
FIG. 15 is a generalized block diagram of a host computer communicating via a base station with a user equipment over a partially wireless connection, according to embodiments herein.

FIG. 15: Host Computer Communicating Via a Base Station with a User Equipment Over a Partially Wireless Connection in Accordance with Some Embodiments Example implementations, in accordance with an embodiment, of the wireless device 130, e.g., a UE, the network node 110 or any of the relay nodes in the plurality of relay nodes 120, e.g., a base station and host computer discussed in the preceding paragraphs will now be described with reference to FIG. 15. In communication system 1500, such as the wireless communications network 100, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes the network node 110 or any of the relay nodes in the plurality of relay nodes 120, exemplified in FIG. 15 as a base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with the wireless device 130, exemplified in FIG. 15 as a UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
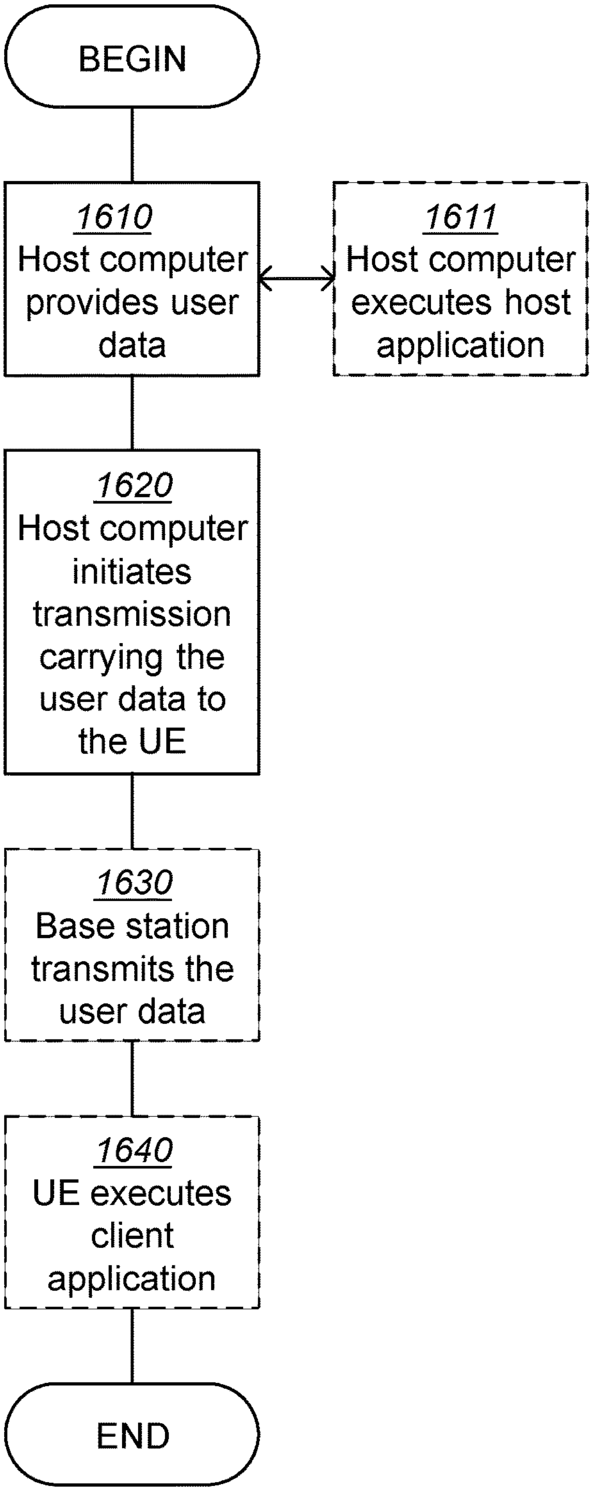
FIG. 16 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
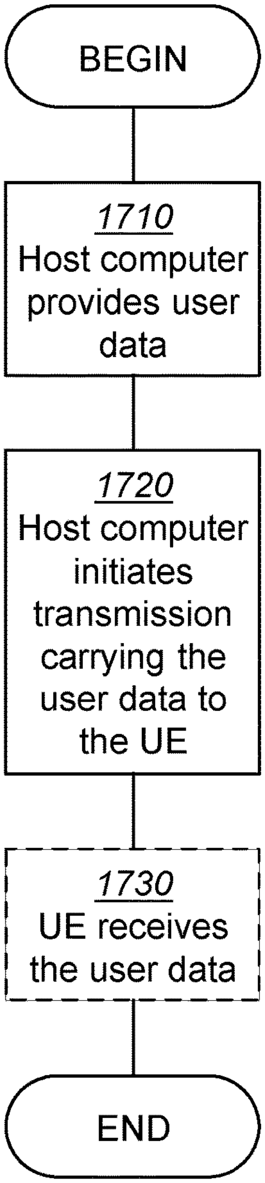
FIG. 17 is a flowchart depicting embodiments of a method in a communications system including a host computer, a base station and a user equipment, according to embodiments herein.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
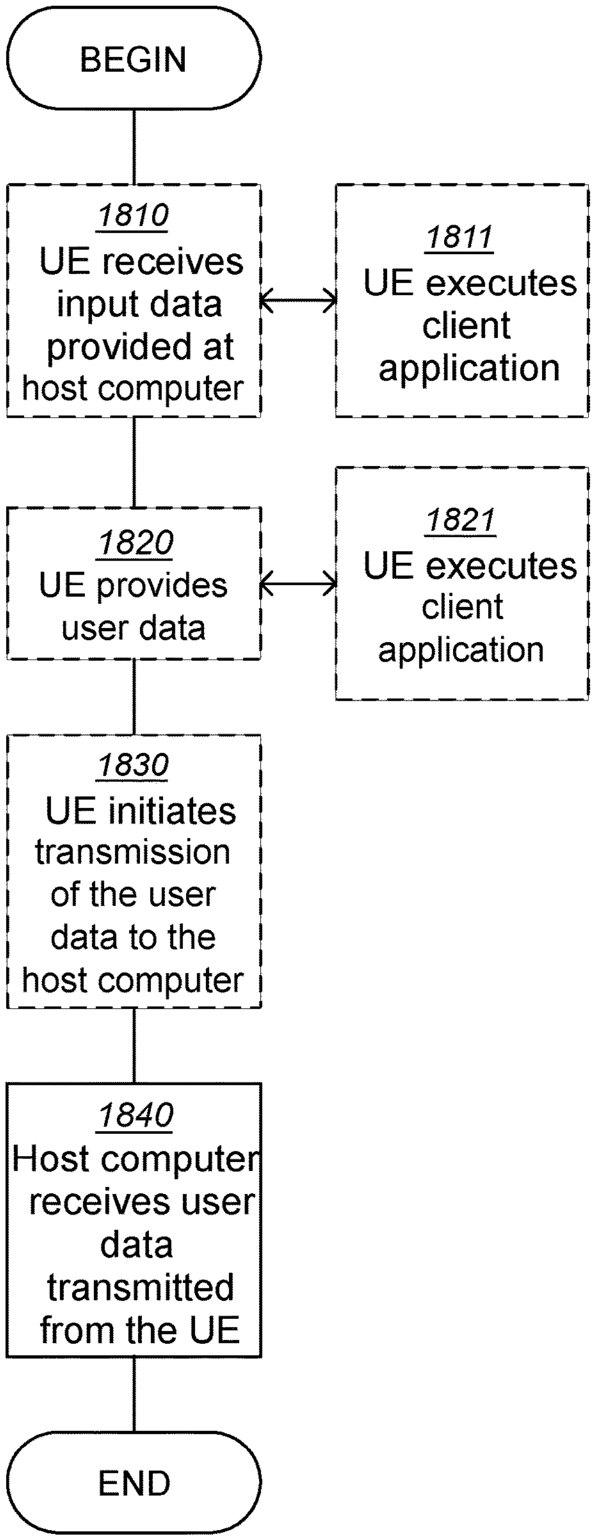
FIG. 18 is a flowchart depicting embodiments of a method in a communications system including a host computer, a base station and a user equipment, according to embodiments herein.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
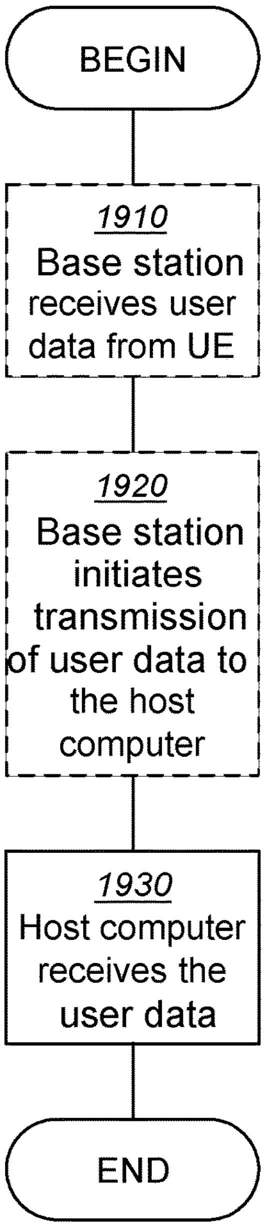
FIG. 19 is a flowchart depicting embodiments of a method in a communications system including a host computer, a base station and a user equipment, according to embodiments herein.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110 or any of the relay nodes in the plurality of relay nodes 120.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform one or more of the actions described herein as performed by the network node 110 or any of the relay nodes in the plurality of relay nodes 120.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by the network node 110 or any of the relay nodes in the plurality of relay nodes 120.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one or more of the actions described herein as performed by the network node 110 or any of the relay nodes in the plurality of relay nodes 120.

16. The method of embodiment 15, further comprising:

at the base station, transmitting the user data.

17. The method of embodiment 16, wherein the user data is provided at the host computer by executing a host application, the method further comprising:

at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs one or more of the actions described herein as performed by the wireless device 130.

36. The method of embodiment 35, further comprising:

at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:

a communication interface configured to receive user data originating from a transmission from a user equipment (UE) to a base station, wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the wireless device 130.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110 or any of the relay nodes in the plurality of relay nodes 120.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110 or any of the relay nodes in the plurality of relay nodes 120.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising one or more of the actions described herein as performed by the network node 110 or any of the relay nodes in the plurality of relay nodes 120.

75. A method implemented in a communication system including a host computer, a base station and a user equipment (UE), the method comprising:

at the host computer, receiving, from the base station, user data originating from a transmission which the base station has received from the UE, wherein the UE performs one or more of the actions described herein as performed by the wireless device 130.

76. The method of embodiment 75, further comprising:

at the base station, receiving the user data from the UE.

77. The method of embodiment 76, further comprising:

at the base station, initiating a transmission of the received user data to the host computer.

The invention claimed is:

1. A computer-implemented method, performed by a first node, for sending a grant to a wireless device comprised in a multi-hop path comprising a plurality of relay nodes, the first node, the plurality of relay nodes and the wireless device operating in a wireless communications network, the method comprising:

sending the grant to the wireless device, the grant indicating an allocation of first time-frequency resources to the wireless device and an indication of the multi-hop path, the grant thereby indicating the allocation of respective second time-frequency resources to each of the relay nodes in the multi-hop path, wherein the first time-frequency resources and the respective second time-frequency resources are allocated in a same transmission occasion and wherein the grant includes the indication of the multi-hop path and a respective hop number for each relay node of the plurality of relay nodes, such that the wireless device and each relay node determine respective time-frequency resources based on the received grant and the hop number.

2. The computer-implemented method of claim 1, wherein at least one of:

a. each of the first time-frequency resources and the respective second time-frequency resources comprise a respective first subset of resources for reception and a respective second subset of resources for transmission, b. each of the first time-frequency resources and the respective second time-frequency are the same in duration and frequency, with the exception of their allocated period of time, and c. each of the respective first subset of resources for reception and the respective second subset of resources for transmission is separated by a time gap.

3. The computer-implemented method of claim 1, wherein the first time-frequency resources and the respective second time-frequency resources are allocated consecutively in time in the transmission occasion, and wherein each of the first time-frequency resources and the respective second time-frequency are separated in time by an offset, so that the respective second subset of resources for transmission of a transmitter is separated by the offset from the respective first subset of resources for reception of a receiver, wherein, in the downlink, the transmitter is one of the relay nodes in the multi-hop path and the receiver being one of:

another of the relay nodes in the multi-hop path and the wireless device, and in the uplink, the transmitter is one of the relay nodes in the multi-hop path and the wireless device, and the receiver is another of the relay nodes in the multi-hop path.

4. The computer-implemented method of claim 3, wherein the method further comprises:

updating the sent grant, by performing at least one of:

activating or deactivating one or more nodes of the plurality of nodes, changing a respective size, L, of any of the first time-frequency resources, and the respective second time-frequency resources, changing the offset for at least one of the replay nodes and the wireless device, and changing the indication of the multi-hop path.

5. The computer-implemented method of claim 3, wherein the method further comprises:

determining which are the plurality of relay nodes in the multi-hop path, assigning a respective hop number to each of the determined relay nodes in the multi-hop path and the wireless device, and scheduling the grant, wherein each of the relay nodes in the multi-hop path and the wireless device are scheduled a time, t, plus the offset, D, multiplied by the assigned respective hop number, and wherein the sent grant is the scheduled grant.

6. The computer-implemented method of claim 1, wherein the indication further indicates a respective hop number for each of the relay nodes in the multi-hop path.

7. The computer-implemented method of claim 1, wherein the grant further indicates that the allocation of the first time-frequency resources and the respective second time-frequency resources is to be repeated periodically.

8. The computer-implemented method of claim 1, wherein the sending is performed in at least one of:

a. a single Downlink Control Information message, and b. a group-common DCI message.

9. A computer-implemented method performed by a second node, the method being for receiving a grant from a first node, the second node being one of: a) a wireless device comprised in a multi-hop path comprising a plurality of relay nodes, and b) one of the relay nodes in the plurality of relay nodes, the wireless device, the plurality of relay nodes and the first node, operating in a wireless communications network, the method comprising:

receiving the grant from the first node, the grant indicating:

an allocation of first time-frequency resources to the wireless device, and an indication of the multi-hop path, the grant further indicating, for each relay node in the multi-hop path, wherein the first time-frequency resources and the respective second time-frequency resources are allocated in a same transmission occasion.

10. The computer-implemented method of claim 9, wherein at least one of:

a. each of the first time-frequency resources and the respective second time-frequency comprise a respective first subset of resources for reception and a respective second subset of resources for transmission, b. each of the first time-frequency resources and the respective second time-frequency resources are the same in duration and frequency, with the exception of their allocated period of time, and c. each of the respective first subset of resources for reception and the respective second subset of resources for transmission is separated by a time gap.

11. The computer-implemented method of claim 9, wherein the first time-frequency resources and the respective second time-frequency resources are allocated consecutively in time in the transmission occasion, and wherein each of the first time-frequency resources and the respective second time-frequency are separated in time by an offset, so that the respective second subset of resources for transmission of a transmitter is separated by the offset from the respective first subset of resources for reception of a receiver, in the downlink, the transmitter is one of the relay nodes in the multi-hop path and the receiver being one of: another of the relay nodes in the multi-hop path and the wireless device, and in the uplink, the transmitter is one of the relay nodes in the multi-hop path and the wireless device, and the receiver being one of: another of the relay nodes in the multi-hop path.

12. The computer-implemented method of claim 11, wherein the method further comprises:

receiving an update of the received grant, by receiving an instruction to perform at least one of:

activate or deactivate one or more nodes of the plurality of relay nodes, change a respective size, L, of any of the first time-frequency resources, and the respective second time-frequency resources, change the offset for at least one of the replay nodes and the wireless device, and change the indication of the multi-hop path.

13. The computer-implemented method of claim 11, wherein the method further comprises:

obtaining a respective hop number from the first node, determining the respective time-frequency resources, or the first time-frequency resources, based on the received grant, wherein each of the relay nodes in the multi-hop path and the wireless device are scheduled a time, t, plus the offset, D, multiplied by the assigned respective hop number, wherein with the proviso that the second node is the wireless device, the second node determines the first time-frequency resources, and with the proviso that the second node is a relay node in the plurality of relay nodes, the second node determines the respective time-frequency resources, and transmitting and/or receiving based on the determined respective time-frequency resources.

14. The computer-implemented method of claim 9, wherein the indication further indicates a respective hop number for each of the relay nodes in the multi-hop path.

15. The computer-implemented method of claim 9, wherein the grant further indicates that the allocation of the first time-frequency resources and the respective second time-frequency resources is to be repeated periodically.

16. The computer-implemented method of claim 9, wherein the receiving is performed in at least one of:

a. a single Downlink Control Information message, and b. a group-common DCI message.

17. A first node, for sending a grant to a wireless device configured to be comprised in a multi-hop path configured to comprise a plurality of relay nodes, the first node, the plurality of relay nodes and the wireless device being configured to operate in a wireless communications network, the first node being further configured to:

send the grant to the wireless device, the grant being configured to indicate:

an allocation of first time-frequency resources to the wireless device, and an indication of the multi-hop path, the grant thereby being configured to indicate the allocation of respective second time-frequency resources to each of the relay nodes in the multi-hop path, wherein the first time-frequency resources and the respective second time-frequency resources are configured to be allocated in a same transmission occasion and wherein the grant includes the indication of the multi-hop path and a respective hop number for each relay node of the plurality of relay nodes, such that the wireless device and each relay node determine respective time-frequency resources based on the received grant and the hop number.

18. A second node, for receiving a grant from a first node, the second node configured to be one of: a) a wireless device configured to be comprised in a multi-hop path configured to comprise a plurality of relay nodes, and b) one of the relay nodes in the plurality of relay nodes, the wireless device, the plurality of relay nodes and the first node, being configured to operate in a wireless communications network, the second node being further configured to:

receive the grant from the first node, the grant being configured to indicate:

an allocation of first time-frequency resources to the wireless device, and an indication of the multi-hop path, the grant further indicating, for each relay node in the multi-hop path, wherein the first time-frequency resources and the respective second time-frequency resources are configured to be allocated in a same transmission occasion.

* * * * *